(12) United States Patent
Quero-Mieres et al.

(10) Patent No.: US 10,720,648 B2
(45) Date of Patent: Jul. 21, 2020

(54) ELECTRODE EDGE PROTECTION IN ELECTROCHEMICAL CELLS

(71) Applicant: Sion Power Corporation, Tucson, AZ (US)

(72) Inventors: Enic Azalia Quero-Mieres, Tucson, AZ (US); Zhaohui Liao, Tucson, AZ (US); Chariclea Scordilis-Kelley, Tucson, AZ (US); Clellie Winter, Tucson, AZ (US); Akmeemana Anoma Mudalige, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 195 days.

(21) Appl. No.: 15/923,342

(22) Filed: Mar. 16, 2018

(65) Prior Publication Data

US 2018/0277850 A1   Sep. 27, 2018

Related U.S. Application Data

(60) Provisional application No. 62/472,716, filed on Mar. 17, 2017.

(51) Int. Cl.
| | | |
|---|---|---|
| *H01M 4/62* | (2006.01) | |
| *H01M 4/13* | (2010.01) | |
| *H01M 4/38* | (2006.01) | |
| *H01M 10/052* | (2010.01) | |
| *H01M 4/136* | (2010.01) | |
| *H01M 4/58* | (2010.01) | |
| *H01M 10/0525* | (2010.01) | |
| *H01M 4/02* | (2006.01) | |

(Continued)

(52) U.S. Cl.
CPC .............. *H01M 4/628* (2013.01); *H01M 4/13* (2013.01); *H01M 4/136* (2013.01); *H01M 4/38* (2013.01); *H01M 4/5825* (2013.01); *H01M 4/62* (2013.01); *H01M 4/622* (2013.01); *H01M 10/052* (2013.01); *H01M 10/0525* (2013.01); *H01M 4/0435* (2013.01); *H01M 4/382* (2013.01); *H01M 4/405* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |

(Continued)

FOREIGN PATENT DOCUMENTS

| | | |
|---|---|---|
| EP | 2 450 989 A2 | 5/2012 |
| EP | 3 038 187 A1 | 6/2016 |

(Continued)

OTHER PUBLICATIONS

Alamgir et al., Lithium Batteries, New Materials, Developments and Perspectives, Chapter 3. Elsevier, Amsterdam. 1994; 93-136.

(Continued)

*Primary Examiner* — Wojciech Haske
(74) *Attorney, Agent, or Firm* — Wolf, Greenfield & Sacks, P.C.

(57) ABSTRACT

Methods and apparatuses for protecting the edge of electrodes and other layers in electrochemical cells are generally described.

18 Claims, 13 Drawing Sheets

US 10,720,648 B2

Page 2

(51) Int. Cl.
*H01M 4/04* (2006.01)
*H01M 4/40* (2006.01)

(56) References Cited

U.S. PATENT DOCUMENTS

| | | | |
|---|---|---|---|
| 4,833,048 A | 5/1989 | DeJonghe et al. |
| 4,917,974 A | 4/1990 | DeJonghe et al. |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,117,590 A | 9/2000 | Skotheim et al. |
| 6,153,337 A | 11/2000 | Carlson et al. |
| 6,201,100 B1 | 3/2001 | Gorkovenko et al. |
| 6,238,821 B1 | 5/2001 | Mukherjee et al. |
| 6,306,545 B1 | 10/2001 | Carlson et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,688,075 B2 | 3/2010 | Kelley et al. |
| 7,771,870 B2 | 8/2010 | Affinito et al. |
| 7,785,730 B2 | 8/2010 | Affinito et al. |
| 7,939,198 B2 | 5/2011 | Mukherjee et al. |
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 2005/0196672 A1 | 9/2005 | Mukherjee et al. |
| 2006/0115579 A1 | 6/2006 | Mukherjee et al. |
| 2007/0221265 A1 | 9/2007 | Affinito et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0035128 A1 | 2/2010 | Scordilis-Kelley et al. |
| 2010/0239914 A1 | 9/2010 | Mikhaylik et al. |
| 2010/0327811 A1 | 12/2010 | Affinito et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0177398 A1 | 7/2011 | Affinito et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2012/0115030 A1* | 5/2012 | Tanaka ............... H01G 11/28 429/211 |
| 2013/0048340 A1 | 2/2013 | Bando et al. |
| 2013/0164635 A1 | 6/2013 | Schmidt et al. |
| 2013/0316072 A1 | 11/2013 | Scordilis-Kelley et al. |
| 2014/0062411 A1 | 3/2014 | Mikhaylik et al. |
| 2014/0079994 A1 | 3/2014 | Affinito et al. |
| 2014/0127419 A1 | 5/2014 | Fleischmann et al. |
| 2014/0127577 A1 | 5/2014 | Fleischmann et al. |
| 2014/0272565 A1 | 9/2014 | Gronwald et al. |
| 2014/0272594 A1 | 9/2014 | Safont et al. |
| 2014/0272595 A1 | 9/2014 | Cristadoro et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0180084 A1 | 6/2015 | Scordilis-Kelley et al. |
| 2015/0188194 A1 | 7/2015 | Mikhaylik et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0287998 A1 | 10/2015 | Scordilis-Kelley et al. |
| 2015/0318539 A1 | 11/2015 | Kelley et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0190540 A1* | 6/2016 | Oshima ............... H01M 2/18 429/162 |
| 2016/0301080 A1 | 10/2016 | Skotheim et al. |
| 2016/0344067 A1 | 11/2016 | Laramie et al. |
| 2017/0018815 A1 | 1/2017 | Laramie et al. |
| 2017/0047590 A1 | 2/2017 | Mikhaylik et al. |
| 2017/0141385 A1 | 5/2017 | Scordilis-Kelley et al. |
| 2017/0141402 A1 | 5/2017 | Affinito et al. |
| 2017/0141442 A1 | 5/2017 | Mikhaylik et al. |
| 2017/0149086 A1 | 5/2017 | Du et al. |
| 2017/0200975 A1 | 7/2017 | Liao et al. |
| 2017/0250390 A1 | 8/2017 | Laramie et al. |
| 2017/0288208 A1 | 10/2017 | Kelley et al. |
| 2017/0338475 A1 | 11/2017 | Laramie et al. |
| 2017/0352863 A1 | 12/2017 | Mikhaylik et al. |
| 2017/0373321 A1 | 12/2017 | Skotheim et al. |
| 2018/0006303 A1 | 1/2018 | Mikhaylik et al. |

(56) References Cited

U.S. PATENT DOCUMENTS

2018/0034100 A1  2/2018  Du et al.
2018/0048018 A1  2/2018  Scordilis-Kelley et al.
2018/0138542 A1  5/2018  Bunte et al.

FOREIGN PATENT DOCUMENTS

WO    WO 99/33125 A1    7/1999
WO    WO 99/33130 A1    7/1999
WO    WO 02/101854 A2   12/2002

OTHER PUBLICATIONS

Dominey, Lithium Batteries, New Materials, Developments and Perspectives, Chapter 4. Elsevier, Amsterdam. 1994; 137-165.

Katzenstein et al., Patterning by Photochemically Directing the Marangoni Effect. ACS Macro Letters. 2012;1:1150-4. Epub Sep. 10, 2012.

Zheng et al., Employing Gradient Copolymer to Achieve Gel Polymer Electrolytes with High Ionic Conductivity. Macromolecules. 2016;49:2179-88. Epub Mar. 10, 2016.

International Search Report and Written Opinion for PCT/US2018/022889 dated Jun. 7, 2018.

\* cited by examiner

ELECTRODE EDGE PROTECTION IN ELECTROCHEMICAL CELLS

RELATED APPLICATIONS

This application claims priority under 35 U.S.C. § 119(e) to U.S. Provisional Patent Application No. 62/472,716, filed Mar. 17, 2017, and entitled "Electrode Edge Protection in Electrochemical Cells," which is incorporated herein by reference in its entirety for all purposes.

TECHNICAL FIELD

Methods and apparatuses for protecting the edge of electrodes and other layers in electrochemical cells are generally described.

BACKGROUND

Electrochemical cells typically include a cathode comprising a cathode active material and an anode comprising an anode active material. The cathode active material and the anode active material can participate in one or more electrochemical reactions, which can be used to generate electrical current.

SUMMARY

Methods and apparatuses for protecting the edge of electrodes and other layers in electrochemical cells are generally described. The subject matter of the present invention involves, in some cases, interrelated products, alternative solutions to a particular problem, and/or a plurality of different uses of one or more systems and/or articles.

In one aspect, electrodes are described. The electrode can comprise, in some embodiments, an electrode active material, an edge, and an edge region proximate the edge. Optionally, the electrode comprises pores. In certain embodiments, a surface-area-normalized accessible capacity of the electrode decreases in at least one direction from the inner border of the edge region of the electrode, through the edge region, toward and to the edge of the electrode. In some embodiments, a surface-area-normalized amount of the electrode active material decreases in at least one direction from the inner border of the edge region of the electrode, through the edge region, toward and to the edge of the electrode. In certain embodiments, a surface-area-normalized pore volume of the electrode decreases in at least one direction from the inner border of the edge region of the electrode, through the edge region, toward and to the edge of the electrode. In some embodiments, a surface-area-normalized conductivity of the electrode decreases in at least one direction from the inner border of the edge region of the electrode, through the edge region, toward and to the edge of the electrode. In some embodiments, a surface-area-normalized electrolyte uptake of the electrode decreases in at least one direction from the inner border of the edge region of the electrode, through the edge region, toward and to the edge of the electrode.

In some embodiments, the electrode comprises an electrode active material, an edge, an edge region proximate the edge, and a central region. Optionally, the electrode comprises pores. In some embodiments, the edge region comprises the outer 1% of the electrode and the central region comprises the central 50% of the electrode. In certain embodiments, the edge region of the electrode has at least one surface-area-normalized accessible capacity that is less than 50% of at least one surface-area-normalized accessible capacity within the central region of the electrode. In certain embodiments, the edge region has at least one surface-area-normalized amount of the electrode active material that is less than 50% of at least one surface-area-normalized amount of the electrode active material within the central region. In accordance with certain embodiments, the edge region of the electrode has at least one surface-area-normalized pore volume that is less than 50% of at least one surface-area-normalized pore volume within the central region of the electrode. In some embodiments, the edge region of the electrode has at least one surface-area-normalized conductivity that is less than 50% of at least one surface-area-normalized conductivity within the central region of the electrode. In certain embodiments, the edge region of the electrode has at least one surface-area-normalized electrolyte uptake that is less than 50% of at least one surface-area-normalized electrolyte uptake within the central region of the electrode. In some embodiments, the edge region comprises a tapered region such that the thickness of the electrode decreases in a direction toward the edge of the electrode.

In accordance with certain embodiments, an electrochemical cell is described. The electrochemical cell may comprise a first electrode comprising a first electrode active material, the first electrode comprising a surface. The electrochemical cell may comprise a second electrode. The electrochemical cell may further comprise a second electrode active material, a surface facing the surface of the first electrode, an edge, an edge region proximate the edge, and a central region, wherein the edge region comprises the outer 1% of the second electrode and the central region comprises the central 50% of the second electrode. The electrochemical cell may further comprise an electrolyte and/or a separator positioned between the first electrode and the second electrode. The first electrode may extend, laterally, past the edge of the second electrode.

In some embodiments, the edge region has at least one surface-area-normalized amount of the second electrode active material that is less than 50% of at least one surface-area-normalized amount of the second electrode active material within the central region. In some embodiments, the edge region of the second electrode has at least one surface-area-normalized pore volume that is less than 50% of at least one surface-area-normalized pore volume within the central region of the second electrode. In some embodiments, the edge region of the second electrode has at least one surface-area-normalized accessible capacity that is less than 50% of at least one surface-area-normalized accessible capacity within the central region of the second electrode. In some embodiments, the edge region of the second electrode has at least one surface-area-normalized conductivity that is less than 50% of at least one surface-area-normalized conductivity within the central region of the second electrode. In some embodiments, the edge region comprises a tapered region that is tapered toward the edge and away from the surface of the first electrode.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
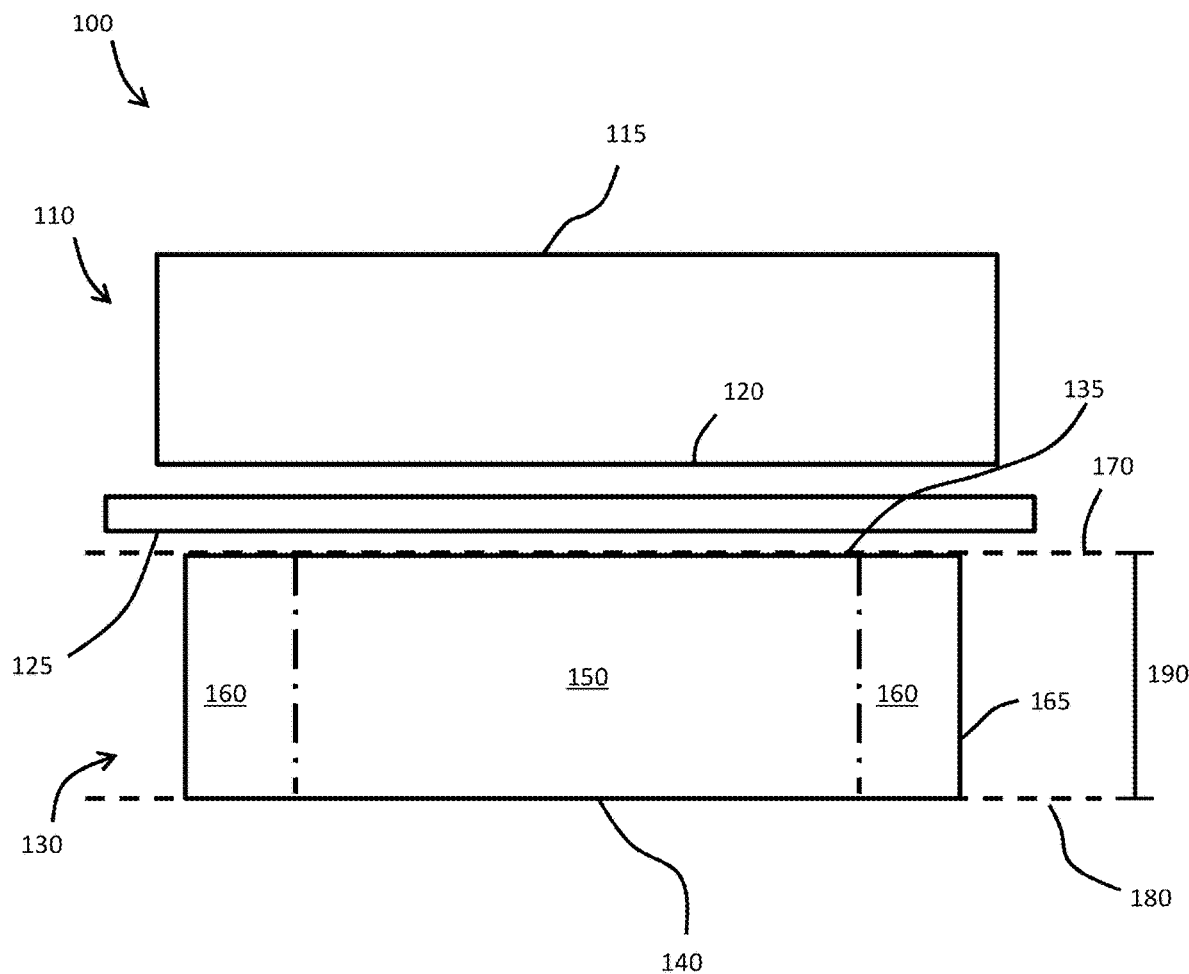
FIG. 1A shows a side view of an electrochemical cell, according to one or more embodiments.

Methods and apparatuses for protecting the edge of electrodes and other layers in electrochemical cells are generally described. Cell designs (including electrode designs) and methods of manufacturing the same to reduce the stress experienced within certain components (e.g., electrodes, protective layers of the electrode, separators, etc.) during cell cycling are generally described, in accordance with certain embodiments. In some embodiments, the electrochemical cells may be rechargeable electrochemical cells (also referred to as secondary electrochemical cells).

Electrochemical cells, including those in which an anode comprises lithium, are sometimes protected by various ceramic, polymer or combination of ceramic and polymer layers. Retaining the integrity of a protective layer and/or other components during cell cycling is one objective considered in the design of electrochemical cells. Due to safety considerations (e.g., to avoid dendrites) cell designs often use an oversized anode that extends at least 1 mm past the cathode edges in a lateral direction. A problem associated with some electrochemical cell designs is that excess stress is applied on the protective layer and/or other cell components during cell cycling. In some cells, during charge or discharge the anode thickness will change, causing stress and/or leading to damage to the protective layer and/or other cell components. Accordingly, improved electrodes, and methods for their manufacture, that protect the edges of electrodes and other layers within an electrochemical cell and facilitate uniform anode utilization during cell cycling are needed.

Some electrochemical cells experience a potentially detrimental over-utilization of a first electrode (e.g., anode) in areas corresponding to edges of a second electrode (e.g., cathode). When these areas are over-utilized, which may occur even during the first charge and discharge of the cell, the available electrode active material (e.g., Li ions) in these areas are utilized faster than the rest of the areas of the first electrode, causing pitting at its edges that shorten the life cycle of the cell. The electrode edges are naturally more active because in addition to the current flowing perpendicular to the active surface there is also current contribution from the edge. The over-utilization could also result from the extra amount of electrolyte trapped in the accessible pores at the steep cut edge of the second electrode edges which are naturally more active. Utilization (from routine charging or discharging) may lead to a sharp step or edge that could damage a protective layer of the first electrode (e.g., anode). Once the protective layer(s) is compromised the lithium may react with electrolyte components leading to metallic lithium depletion (and eventually overutilization).

According to one or more embodiments, cell designs (including electrode designs) and manufacturing methods are provided that avoid the formation of a sharp step at the cathode edge and/or over-utilization of a first electrode (e.g., anode) active material at the areas matching the second electrode (e.g., cathode) edges through various techniques. In some embodiments a gradient in the thickness of the cathode (also referred to as a tapered edge) is provided, which, in turn, reduces the amount of electrolyte trapped in the pores of the cathode (as well as the amount of electrode active material) in the direction extending outwardly toward an edge. In some embodiments, a coating is applied to the cathode edge region with appropriate polymers or other electrochemically inactive filler material to block a portion of the pores within the cathode. In some embodiments the pores are blocked such that, spatially, the pore volume decreases in the direction extending outwardly toward an edge. In some embodiments, a compressed edge region of the cathode is provided to reduce the pore volume and trapped electrolyte volume within the edge region of the cathode. In some embodiments, a coating (e.g., a polymer and/or other electrochemically inert material) may be applied to the cathode edge region to reduce the electrolyte uptake in that region (e.g., due to the limited extent to which the coating can be wetted by the electrolyte). Other techniques may also be applied to otherwise reduce the actual accessible capacity of the cathode in an edge region. In some embodiments, a coating (e.g., a polymer and/or other electrochemically inert material) may be applied to the cathode edge region to reduce the conductivity in that region. In some embodiments, heat may be applied to the cathode edge region to reduce the conductivity of that region. For example, in embodiments in which the cathode comprises sulfur, heat may be applied to partially polymerize the sulfur, and render it less electrochemically active.

Overcoming the issues associated with formation of a sharp step and/or over-utilization of an electrode active material at the active edges may lead to one or more advantages, in accordance with certain embodiments. In some embodiments, it may result in the reduction of the stress experienced by cell components during cycling and/or prevention of component cracking. In some embodiments, it may result in the prevention of dendrite growth at edge regions thereby preventing cell shorting. In some embodiments, it may result in a decrease in the extent of electrolyte side reaction with an electrode active material, and therefore delay of electrolyte depletion, a common cause of failure in electrochemical cells. In some embodiments, it may result in the prevention of cell failure due to loss of electronic conduction between electrode active material and a current collector.

To facilitate the description of the electrodes and electrochemical cells described herein, and in particular the design of electrodes in which one or more properties of the electrode differ within different regions of the electrode, reference is made to the concepts of a "central region," an "edge region," "surface-area-normalized" properties, "central-region-normalized" properties, and "edge-region-normalized" properties, definitions and descriptions for each of which are provided below.

According to one or more embodiments, an electrochemical cell comprises a first electrode, a second electrode, and a separator arranged between the first and second electrodes. Other components may also be present. In one set of embodiments, an electrochemical cell described herein is a lithium-sulfur cell comprising a first electrode comprising lithium, a second electrode comprising sulfur, and a separator arranged between the first and second electrodes.

According to one or more embodiments, a first electrode (e.g., anode) comprises an outer surface, an inner surface, and at least one edge. As used herein, the outer surface of the first electrode (e.g., anode) refers to the surface facing away from, or opposite to, the second electrode (e.g., cathode), and, in embodiments comprising a separator, facing away from, or opposite to, the separator. As used herein, the inner surface of the first electrode (e.g., anode) refers to the surface facing the second electrode (e.g., cathode), and, in embodiments comprising a separator, facing the separator. While some variation along each of the outer and inner surfaces of the first electrode (e.g., anode) will be present, when laid out in a flat orientation, at least a portion (e.g., central region) of the outer surface will be substantially parallel to at least a portion (e.g., central region) of the inner surface of the first electrode.

The first electrode (e.g., anode) may comprise a first electrode active material. The first electrode active material may comprise lithium (e.g., the first electroactive material may comprise lithium metal and/or a lithium alloy). In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the first electrode may be porous (e.g., comprising a lithium intercalation compound in combination with one or more optional conductive additives and/or one or more binders) or non-porous (e.g., in the case of certain lithium metal and/or lithium alloy foils or sheets). Addition details regarding the first electrode are provided below.

As used herein, a surface (or surface portion) is said to be "facing" an object when a line extending normal to the surface and away from the bulk of the material from which the surface is formed intersects the object. For example, a first surface (or first surface portion) and a second surface (or second surface portion) can be facing each other if a line normal to the first surface and extending away from the bulk of the material from which the first surface is formed intersects the second surface. A surface and a layer can be facing each other if a line normal to the surface and extending away from the bulk of the material from which the surface is formed intersects the layer. A surface can be facing another object when it is in contact with the other object, or when one or more intermediate materials are positioned between the surface and the other object. For example, two surfaces that are facing each other can be in contact or can include one or more intermediate materials between them.

As used herein, a surface (or surface portion) is said to be "facing away from" or "opposite to" an object when no line extending normal to the surface and away from the bulk of the material from which the surface is formed intersects the object. For example, a first surface (or first surface portion) and a second surface (or second surface portion) can be facing away from each other if no line normal to the first surface and extending away from the bulk of the material from which the first surface is made intersects the second surface. A surface and a layer can be facing away from each other if no line normal to the surface and extending away from the bulk of the material from which the surface is made intersects the layer. In some embodiments, a surface and another object (e.g., another surface, a layer, etc.) can be substantially parallel, for example, if the maximum angle defined by the surface and the object is less than about 10°, less than about 5°, less than about 2°, or less than about 1°.

The second electrode (e.g., cathode) also comprises an inner surface, an outer surface, and at least one edge. As used herein, the inner surface of the second electrode (e.g., cathode) refers to the surface facing the first electrode (e.g., anode), and, in embodiments comprising a separator, facing the separator. As used herein, the outer surface of the second electrode (e.g., cathode) refers to the surface facing away from, or opposite to, the first electrode (e.g., anode), and, in embodiments comprising a separator, opposite the separator. While some variation along each of the inner and outer surfaces of the second electrode (e.g., cathode) will be present, when laid out in a flat orientation, at least a portion (e.g., central region) of the inner surface will generally be substantially parallel to at least a portion (e.g., central region) of the outer surface, and also substantially parallel to at least a portion of the inner and outer surfaces of the first electrode (e.g., anode).

The second electrode (e.g., cathode) may comprise a second electrode active material. The second electrode active material may comprise sulfur. The second electroactive material may comprise lithium (e.g., a lithium intercalation compound). In some embodiments, the second electrode may be porous (e.g., comprising sulfur or a lithium intercalation compound in combination with one or more optional conductive additives and/or one or more binders). Additional details regarding the second electrode are provided below.

For example, referring to the embodiment shown in FIG. 1A, an electrochemical cell 100 comprises a first electrode (e.g., anode) 110, a separator 125, and a second electrode (e.g., cathode) 130, laid out in a flat orientation. The first electrode 110 comprises an outer surface 115 opposite to the separator 125 and the second electrode 130. The first electrode 110 further comprises an inner surface 120 facing the separator 125, and the second electrode 130. The outer surface 115 and the inner surface 120 of the first electrode 110 are substantially parallel to one another.

The second electrode (e.g., cathode) 130 comprises an inner surface 135 facing the separator 125 and the first electrode 110. The second electrode further comprises an outer surface 140 opposite the separator 125 and the first electrode 110. The inner surface 135 and the outer surface 140 are substantially parallel to one another in a central portion 150 of the second electrode 130. The second electrode 130 further comprises an edge region 160 proximate to a lateral edge 165. The plane formed by the inner surface 135 within the central region 150 of the second electrode 130 may be extended indefinitely to represent an inner surface geometrical plane 170. Likewise, the plane formed by the outer surface 140 within the central region 150 of the second electrode 130 may be extended indefinitely to represent an outer surface geometrical plane 180. Geometrical planes 170 and 180 are parallel or substantially parallel to each other. The length of a line from plane 170 to plane 180 and perpendicular to both planes 170 and 180 is referred to as the electrode height 190 (also referred to elsewhere herein as the electrode thickness). In certain embodiments, the first electrode (e.g., anode) 110 may be oversized as shown in FIG. 1 such that it extends, laterally, past (e.g., at least 1 mm past) the edges 165 of the second electrode (e.g., cathode) 130 in a lateral direction. Such a design may be employed for safety considerations (i.e., to avoid dendrites). It should be understood, however, that the use of an electrode that laterally extends past the other electrode is not required, and in some embodiments, there is no lateral extension of one electrode past the other.

While the components of the electrochemical cell 100 in FIG. 1 are shown as having a planar configuration, other embodiments may include non-planar configurations. For example electrochemical cells described herein may be of any other shape including, but not limited to, prisms (e.g., triangular prisms, rectangular prisms, etc.), "Swiss-rolls," Z configurations, non-planar stacks, etc. Additional configurations are described in U.S. Pat. No. 7,771,870, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety and for all purposes.

According to some embodiments, a central region of the electrode constitutes a certain percentage of the interior of the electrode, while an edge region comprises a certain percentage of the electrode proximate to a lateral edge. In some embodiments, each of the central region and the edge region may be defined as follows. If one were to form a line from a geometrical center of the electrode to any point at an outermost edge of the electrode, the central region would be defined as the region within which a given percentage (e.g., 50%) of the length of the line nearest the center falls. Likewise, if one were to form a line from a geometrical center of the electrode to any point at an outermost edge of the electrode, the edge region would be defined as the region within which a given percentage of the length of the line nearest the outermost point (e.g., outer 20%) falls. The central region and edge region may abut or be spaced apart from one another; however the central region and edge region do not overlap in any single embodiment.

Figure 5:
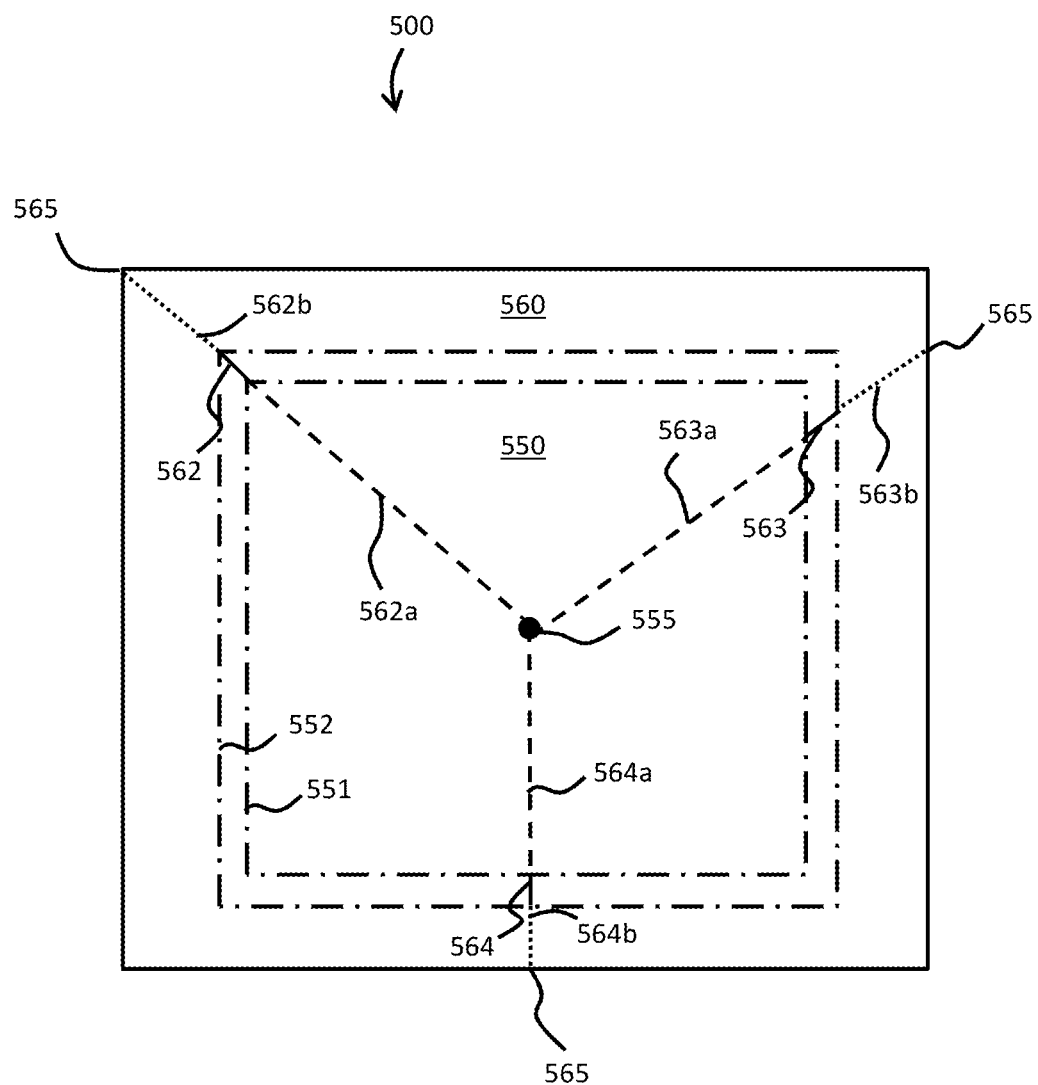
FIG. 5 shows a top view of an electrode, according to one or more embodiments.

As an example of how a central region and an edge region may be defined, FIG. 5 shows a top view of an electrode (e.g., cathode) 500, according to one or more embodiments. The electrode 500 has a geometric center 555 defined as the average position of all the points in the plane of the electrode 500. A line 562 from the center 555 to an outermost edge 565 comprises a first portion 562a and a second portion 562b. The length of each of the portions 562a and 562b may be based on a predetermined percentage of the entire length, or a predetermined absolute length. Following this pattern, other lines such as 563 (which comprises portions 563a and 563b) and 564 (which comprises portions 564a and 564b) may also be drawn. The central region 550, the outer border of which is shown by dashed line 551, is defined as the region within which the first portion (e.g., 562a) of each line falls. The edge region 560, the inner border of which is shown by dashed line 552, is defined as the region within which the second portion (e.g., 562b) of each line falls. The central region 550 and edge region 560 may be spaced apart (as illustrated in FIG. 5), or may abut one another.

According to some embodiments, the central region comprises the central 50% of the electrode. For example, the central region may be the area within which the innermost 50%, 60%, 70%, 80%, 85%, 90%, 95%, or 99% of the length of any line formed from the geometrical center to an outermost point falls, otherwise referred to as the central 50%, 60%, 70%, 80%, 85%, 90%, 95%, or 99% of the electrode. In some embodiments, the central region is at least any of the above percentages. That is to say, in some embodiments, the central region is the central 50%, 60%, 70%, 80%, 85%, 90%, 95%, or 99% of the electrode. Other values are also possible.

According to some embodiments, the edge region comprises the outer 1% of the electrode. For example, the edge region may be the area within which the outermost 20%, 15%, 10%, 5%, or 1% of the length of any line formed from the geometrical center to an outermost point falls, otherwise referred to as an outer 20%, 15%, 10%, 5%, or 1% of the electrode. In some embodiments, the edge region is at least any of the above percentages. That is to say, in some embodiments, the edge region is the outer 20%, 15%, 10%, 5%, or 1% of the electrode. Other values are also possible.

According to some embodiments, the central and edge regions, respectively, of the electrode are defined by an absolute length from an outermost lateral edge of the electrode. According to some embodiments, the edge region comprises the outer 0.2 mm of the electrode. For example, in some embodiments, the edge region is the area of the electrode within 0.2 mm, 0.4 mm, 0.6 mm, 0.8 mm, 1.0 mm, 1.2 mm, 1.4 mm, 1.6 mm, 1.8 mm, or 2 mm of an outermost edge of the electrode, or, in other words, the outer 0.2 mm, 0.4 mm, etc., of the electrode. In some embodiments, the edge region is at least any of the above lengths. Ranges of the above values are also possible, for example the edge region may be the area of the electrode within at least 0.2 mm of an outermost edge and less than or equal to 2.0 mm of an outermost edge. In some embodiments, the central region may be defined as the area of the electrode within 0.5 cm, 1 cm, 2 cm, 3 cm, 4 cm, or 5 cm of the geometrical center of the electrode, or, in other words, the central 0.5 cm, 1 cm, etc., of the electrode. In some embodiments, the central region is at least any of the above lengths. Ranges of the above values are also possible, for example the edge region may be the area of the electrode within at least 0.5 cm of the geometrical center and less than or equal to 5.0 cm of the geometrical center.

Different factors may contribute to the size chosen for the edge region and central region, including the overall width, length, or height/thickness of the electrode.

According to one or more embodiments, these geometrical aspects of the electrode (e.g., planes 170 and 180 and height 190) may be used to provide a surface-area-normalized value for one or more chemical or physical properties of the second electrode (e.g., cathode), a term further defined below. Normalized properties of the electrode may then be compared between different portions or regions of the electrode, for example, a central region 150 and an edge region 160. Relevant properties of the electrode that may be surface-area-normalized may include, for example, accessible capacity, volume of porosity, amount of electroactive material, electrolyte uptake, etc.

Figure 1B:
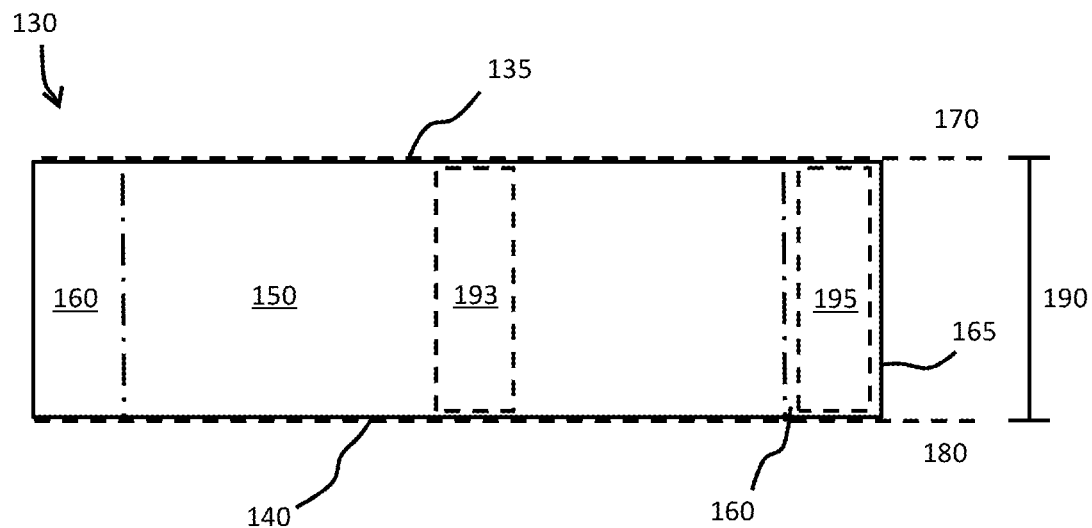
FIG. 1B shows a side view of an electrode, according to one or more embodiments.
Figure 1C:
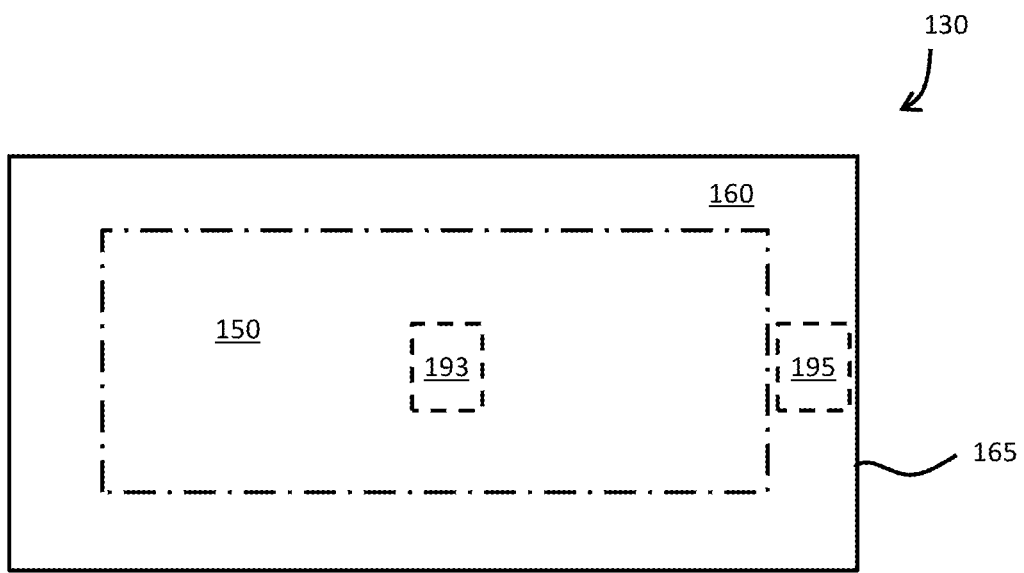
FIG. 1C shows a top view of an electrode, according to one or more embodiments.

According to one or more embodiments, one or more properties of the electrode may be surface-area-normalized. As used herein a "surface-area-normalized" property refers to a value of a property of the electrode within a volume defined by a 0.01 mm$^2$ square, contiguous area in the outer surface geometrical plane (e.g., plane 180 of FIGS. 1A-1C) extended to the inner surface geometrical plane (e.g., plane 170 of FIGS. 1A-1C), or in other words having for a height the distance between the two planes (e.g., height 190). Referring to FIGS. 1B and 1C, which show a side view and a top view, respectively, of the electrode (e.g., cathode) 130, a first surface area normalized volume 193 is defined by dashed lines within a central region 150 of the electrode 130, while a second surface area normalized volume 195 is defined by dashed lines within an edge region 160 of the electrode 130. In each of volumes 193 and 195, a 0.01 mm$^2$ area within the bottom surface geometrical plane 140 is extended for the height 190 to define the surface-area-normalized volumes 193 and 195. The surface-area-normalized volume may be used to compare properties within different regions of the electrode 130.

According to one or more embodiments, one or more properties of the electrode may be "central-region-normalized." As used herein, a "central-region-normalized" property refers to a value of a property of the electrode within a volume defined by the area of the central region (e.g., area 150 of the FIGS. 1A-1C) in the outer surface geometrical plane (e.g., plane 180 of FIGS. 1A-1C) extended to the inner surface geometrical plane (e.g., plane 170 of FIGS. 1A-1C), or in other words having for a height the distance between the two planes (e.g., height 190).

According to one or more embodiments, one or more properties of the electrode may be "edge-region-normalized." As used herein, an "edge-region-normalized" property refers to a value of a property of the electrode within a volume defined by the area of the edge region (e.g., area 160 of the FIGS. 1A-1C) in the outer surface geometrical plane (e.g., plane 180 of FIGS. 1A-1C) extended to the inner surface geometrical plane (e.g., plane 170 of FIGS. 1A-1C), or in other words having for a height the distance between the two planes (e.g., height 190).

Figure 13A:
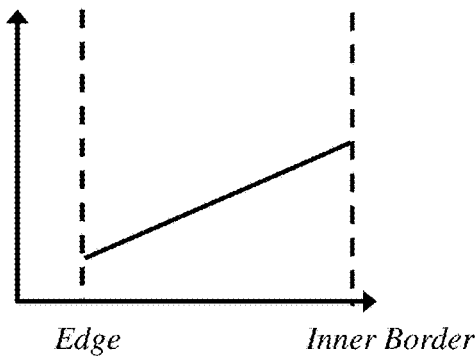
FIGS. 13A-13D are plots of surface-area-normalized properties as a function of position within an edge region, in accordance with certain embodiments.
Figure 13B:
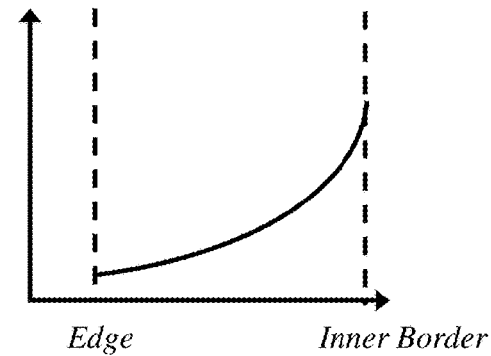
Figure 13C:
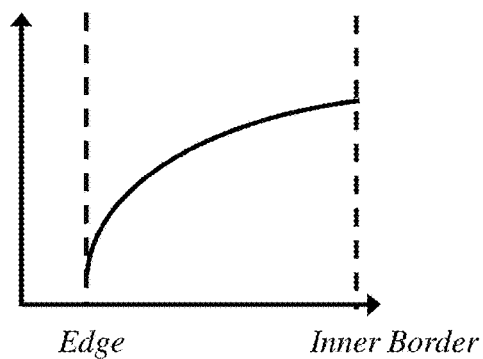
Figure 13D:
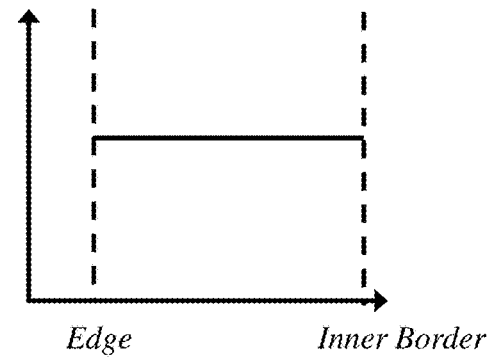

In some embodiments, the changes in the value of the surface-area normalized property occur substantially continuously within the edge region (for example, in embodiments wherein the edge region of the electrode is tapered, or when a gradient copolymer coating is applied, discussed further herein). In some embodiments, the change in value of a surface-area normalized property within the edge region is such that the value at the edge of the electrode differs from the value at the inner border of the edge region, and there is no segment in the edge region that occupies 10% of the width of the edge region and within which the value of the surface-area normalized property changes, across the width of the segment, by less than 2% (or less than 5%) of the value of the surface-area normalized property at the inner border of the edge region. Substantially continuous changes of a surface-area normalized property in the edge region can be, in accordance with certain embodiments, linear in profile in going from the inner border to the edge of the electrode. One example of such linear change is represented in FIG. 13A. Substantially continuous changes of a surface-area normalized property in the edge region can also be, in accordance with some embodiments, nonlinear in profile in going from the inner border to the edge of the electrode. Examples of such nonlinear profiles can be concave up (that is, the rate of change of the value decreases in going from the inner border to the edge, an example of which is represented in FIG. 13B), or concave down (that is, the rate of change of the value increases in going from the inner border to the edge, an example of which is represented in FIG. 13C). In some embodiments, the changes in value of the surface-area normalized property occur monotonically in a direction from the inner border of the edge region, through the edge region, toward and to the edge of the electrode. In some embodiments, the change in the surface-area normalized property of interest (e.g., accessible capacity) occurs stepwise (for example, in some embodiments wherein the edge region of the electrode is substantially uniformly compressed, discussed further herein). An example of a substantially uniform profile of a surface-area normalized property in the edge region (i.e., one in which the change in the property is stepwise) is shown in FIG. 13D. These concepts of edge region, central region, surface-area-normalization, edge-region-normalization, and central-region-normalization are used herein to aid in the description of how an electrode (e.g., cathode) may be designed and made to provide for different values of specified properties between different regions of the electrode to protect against damage and/or over-utilization in an edge region.

According to one or more embodiments, at least one surface-area-normalized accessible capacity (defined in units of, for example, mAh/cm$^2$) in an edge region of the second electrode is less than a surface-area-normalized accessible capacity in a central region of the second electrode.

As used herein, the term "accessible capacity" is given its ordinary meaning and refers to the capacity per unit area that can be accessed during normal cycling (e.g., charge and discharge according to the manufacturer's recommendations and/or during a duty cycle usage of a device that incorporates the battery).

A reduction in surface-area-normalized accessible capacity in the edge region compared to the central region may be achieved through a number of techniques, including without limitation: by reduction in active material, reduction of porosity, reduction of electrolyte uptake by the electrode, or any other cause of reduction in capacity like chemical deactivation (chemical or electrochemical removal of active material or a reduction in conductivity).

According to the embodiment illustrated in FIGS. 1B and 1C, the second electrode 130 has an edge region 160 and a central region 150. The second electrode (e.g., cathode) 130 has a first surface 135 which faces the first electrode (e.g., anode) in the electrochemical cell and that is in the geometrical plane 170. The second electrode 130 also comprises a second surface 140 that faces away from the first electrode in the electrochemical cell and that is in the geometrical plane 180. The planes 170 and 180 are parallel and separated by a distance or height 190. Surface-area-normalized volumes 193 or 195 are the volumes arrived at by extending a pre-defined contiguous area (e.g., 0.01 mm²) in the plane 180 by the height 190. The amount of accessible capacity within at least one surface-area-normalized volume 193 (i.e., a surface-area-normalized accessible capacity) within the central region 150 is greater than the amount of accessible capacity within at least one surface-area-normalized volume 195 (i.e., a surface-area-normalized accessible capacity) within the outer region 160.

According to one or more embodiments, at least one surface-area normalized accessible capacity in the edge region of the second electrode has a value of less than 50%, 45%, 40%, 35,%, 30%, or 25% of at least one surface-area normalized accessible capacity in the central region. Such a reduction in accessible capacity from the central region to the edge may prevent or aid in preventing over-utilization in the edge regions of a first electrode. For such embodiments, the edge region and central region of an electrode may be defined according to any of the values discussed above for those regions.

According to one or more embodiments, the edge-region-normalized accessible capacity of the edge region (e.g., region 160) of the second electrode is less than the central-area-normalized accessible capacity of the central region (e.g., region 150) of the second electrode. According to one or more embodiments, the edge-region-normalized accessible capacity of the edge region of the second electrode has a value of less than 80%, 75%, 70%, 65,%, 60%, or 55% of the central-area-normalized accessible capacity of the central region of the second electrode. Such a reduction in accessible capacity from the central region to the edge region may prevent or aid in preventing over-utilization in the edge regions of an electrode. For such embodiments, the edge region and central region of the electrode may be defined according to any of the values discussed above for those regions.

The accessible capacity of different portions within an electrode, such as an edge region or a central region or a portion within the edge region or central region, may be measured indirectly through examination of an anode or counter-electrode. For example, the local accessible capacity of a portion of a cathode may be determined by fully discharging an electrochemical cell containing the cathode, so that the cathode is at full capacity for electrode active material (e.g., lithium). Next, the cathode may be removed and placed into a new cell comprising that cathode, a separator, and an anode (such as lithium foil) or a counter-electrode (such as copper foil), and filled with electrolyte. The new cell may then be fully charged, causing electrode active material (e.g., lithium) to be deposited from the cathode onto corresponding portions of the anode. Measurement of the thickness of electrode active material deposited onto the anode for a specific portion of the anode (or the counter-electrode in the case of copper foil) may be determined via scanning electron microscopy ("SEM") or by physically separating (e.g., cutting) that portion and weighing, or otherwise measuring, it. The thickness of the electrode active material (e.g., lithium) for a given portion of an anode is indicative of the accessible capacity for the corresponding portion of the cathode.

In accordance with some embodiments, the surface-area-normalized accessible capacity may decrease within the edge region of the second electrode, in at least one direction from the inner boundary, through the edge region, toward and to the edge of the electrode. For example, referring to FIG. 5, in some embodiments, the surface-area-normalized accessible capacity may decrease within edge region 560 of second electrode 500, in at least one direction from inner boundary 552 of edge region 560, through edge region 560, toward and to edge 565 of second electrode 500. An example of one such direction is indicated by dotted line 563*b* in FIG. 5. In some embodiments, a plot of the surface-area-normalized accessible capacity as a function of distance along line segment 563*b* would show a decrease in the surface-area-normalized accessible capacity as one moves from the part of line segment 563*b* in contact with inner boundary 552, along line segment 563*b*, and toward and to the part of line segment 563*b* in contact with edge 565.

In some embodiments, the decrease in surface-area-normalized accessible capacity, in at least one direction from the inner border of the edge region, through the edge region, toward and to the edge of the second electrode, may be substantially continuous. In some embodiments, the decrease in surface-area-normalized accessible capacity, in at least one direction from the inner border of the edge region, through the edge region, toward and to the edge of the second electrode, may be linear, as exemplified in FIG. 13A. In some embodiments, the decrease in surface-area-normalized accessible capacity, in at least one direction from the inner border of the edge region, through the edge region, toward and to the edge of the second electrode, may be monotonic. In some embodiments, the decrease in value of the surface-area-normalized accessible capacity within the edge region is such that the value at the edge of the electrode is less than the value at the inner border of the edge region, and there is no segment in the edge region that occupies 10% of the width of the edge region and within which the value of the surface-area normalized accessible capacity changes, across the width of the segment, by less than 2% (or less than 5%) of the value of the surface-area normalized accessible capacity at the inner border of the edge region. In some embodiments, the rate of change of the decrease in surface-area-normalized accessible capacity, in at least one direction from the inner border of the edge region, through the edge region, toward and to the edge of the second electrode, may decrease monotonically (i.e., the profile of the accessible capacity may be concave up), as exemplified in FIG. 13B. In some embodiments, the rate of change of the decrease in surface-area-normalized accessible capacity, in at least one direction from the inner border of the edge region, through the edge region, toward and to the edge of the second electrode, may increase monotonically (i.e., the profile of the accessible capacity may be concave down), as exemplified in FIG. 13C. In some embodiments, the surface-area-normalized accessible capacity at the edge of the electrode is at least 40% less than the surface-area-normalized accessible capacity at the inner border of the edge region. In some embodiments, the rate of change of the surface-area-normalized accessible capacity, in at least one direction from the inner border of the edge region, through the edge region, toward and to the edge of the second electrode, is substantially continuous.

Any of the profiles for surface-area-normalized accessible capacity in the edge region described above may be accomplished through spatially varying, in at least one direction from the inner border of the edge region, through the edge region, toward and to the edge of the electrode, the application of any technique capable of reducing accessible capacity. Such techniques could include, but are not limited to, reduction of the amount of active material, reduction of porosity, reduction of the electrolyte uptake by the electrode, or any other cause of reduction in capacity like chemical deactivation (chemical or electrochemical removal of active material or a reduction in conductivity).

According to one or more embodiments, at least one surface-area-normalized conductivity in an edge region of the second electrode is less than a surface-area-normalized conductivity in a central region of the second electrode.

A reduction in surface-area-normalized conductivity in the edge region compared to the central region may be achieved through a number of techniques. In some embodiments, a coating (e.g., a polymer and/or other electrochemically inert material) may be applied to the cathode edge region to reduce the conductivity in that region. In some embodiments, heat may be applied to the cathode edge region to reduce the conductivity of that region. For example, in embodiments in which the cathode comprises sulfur, heat may be applied to partially polymerize the sulfur, and render it less electrochemically active.

According to one or more embodiments, at least one surface-area normalized conductivity in the edge region of the second electrode has a value of less than 50%, 45%, 40%, 35,%, 30%, or 25% of at least one surface-area normalized conductivity in the central region. Such a reduction in conductivity from the central region to the edge may prevent or aid in preventing over-utilization in the edge regions of a first electrode. For such embodiments, the edge region and central region of an electrode may be defined according to any of the values discussed above for those regions.

According to one or more embodiments, the edge-region-normalized conductivity of the edge region (e.g., region 160) of the second electrode is less than the central-area-normalized conductivity of the central region (e.g., region 150) of the second electrode. According to one or more embodiments, the edge-region-normalized conductivity of the edge region of the second electrode has a value of less than 80%, 75%, 70%, 65,%, 60%, or 55% of the central-area-normalized conductivity of the central region of the second electrode. Such a reduction in conductivity from the central region to the edge region may prevent or aid in preventing over-utilization in the edge regions of an electrode. For such embodiments, the edge region and central region of the electrode may be defined according to any of the values discussed above for those regions.

The conductivity of different regions of an electrode (e.g., cathode) may be determined through use of an atomic force microscope ("AFM") operating in a conductive mode, which is able to map the local conductivities within an electrode.

In accordance with some embodiments, the surface-area-normalized conductivity may decrease within the edge region of the second electrode, in at least one direction from the inner boundary, through the edge region, toward and to the edge of the electrode. For example, referring to FIG. 5, in some embodiments, the surface-area-normalized conductivity may decrease within edge region 560 of second electrode 500, in at least one direction from inner boundary 552 of edge region 560, through edge region 560, toward and to edge 565 of second electrode 500. An example of one such direction is indicated by dotted line 563b in FIG. 5. In some embodiments, a plot of the surface-area-normalized conductivity as a function of distance along line segment 563b would show a decrease in the surface-area-normalized conductivity as one moves from the part of line segment 563b in contact with inner boundary 552, along line segment 563b, and toward and to the part of line segment 563b in contact with edge 565.

In some embodiments, the decrease in surface-area-normalized conductivity, in at least one direction from the inner border of the edge region, through the edge region, toward and to the edge of the second electrode, may be substantially continuous. In some embodiments, the decrease in surface-area-normalized conductivity, in at least one direction from the inner border of the edge region, through the edge region, toward and to the edge of the second electrode, may be linear, as exemplified in FIG. 13A. In some embodiments, the decrease in surface-area-normalized conductivity, in at least one direction from the inner border of the edge region, through the edge region, toward and to the edge of the second electrode, may be monotonic. In some embodiments, the decrease in value of the surface-area-normalized conductivity within the edge region is such that the value at the edge of the electrode is less than the value at the inner border of the edge region, and there is no segment in the edge region that occupies 10% of the width of the edge region and within which the value of the surface-area normalized conductivity changes, across the width of the segment, by less than 2% (or less than 5%) of the value of the surface-area normalized conductivity at the inner border of the edge region. In some embodiments, the rate of change of the decrease in surface-area-normalized conductivity, in at least one direction from the inner border of the edge region, through the edge region, toward and to the edge of the second electrode, may decrease monotonically (i.e. the profile of the conductivity may be concave up), as exemplified in FIG. 13B. In some embodiments, the rate of change of the decrease in surface-area-normalized conductivity, in at least one direction from the inner border of the edge region, through the edge region, toward and to the edge of the second electrode, may increase monotonically (i.e. the profile of the conductivity may be concave down), as exemplified in FIG. 13C. In some embodiments, the surface-area-normalized conductivity at the edge of the electrode is at least 40% less than the surface-area-normalized conductivity at the inner border of the edge region. In some embodiments, the rate of change of the surface-area-normalized conductivity, in at least one direction from the inner border of the edge region, through the edge region, toward and to the edge of the second electrode, is substantially continuous.

Any of the profiles for surface-area-normalized conductivity in the edge region described above may be accomplished through spatially varying, in at least one direction from the inner border of the edge region, through the edge region, toward and to the edge of the electrode, the application of any technique capable of adjusting conductivity. Such techniques could include, but are not limited to, selective adjustment of the concentration of a conductive additive (e.g., carbon powders such as carbon black, etc.) in the electrode, tailoring the conductivity of a binder or other polymer used to hold the electrode together, or any other technique for adjusting the conductivity of the electrode.

According to one or more embodiments, at least one surface-area-normalized amount of the second electrode active material (defined in units of, for example, $g/cm^2$) in an edge region (e.g., within volume 195 of region 160) of the electrode is less than a surface-area-normalized amount of the second electrode active material in a central region of the electrode (e.g., within volume 193 of region 150).

According to one or more embodiments, at least one surface-area-normalized amount of the second electrode active material in the edge region has a value of less than 50%, 45%, 40%, 35,%, 30%, or 25% of at least one surface-area-normalized amount of the second electrode active material in the central region. For such embodiments, the edge region and central region of the electrode may be defined according to any of the values discussed above for those regions.

According to one or more embodiments, the edge-region-normalized amount of the second electrode active material of the edge region of the second electrode is less than the central-area-normalized amount of the second electrode active material of the central region of the second electrode.

According to one or more embodiments, the edge-region-normalized amount of the second electrode active material in the edge region of the second electrode has a value of less than 80%, 75%, 70%, 65,%, 60%, or 55% of the central-area-normalized amount of the second electrode active material in the central region of the second electrode. Such a reduction in a normalized amount of the second electrode active material from the central region to the edge region may prevent or aid in preventing over-utilization in the edge regions of an electrode. For such embodiments, the edge region and central region of the electrode may be defined according to any of the values discussed above for those regions.

The amount of electrode active material within different portions of an electrode, such as an edge region or a central region or a portion within the edge region or central region, may be measured by physically separating the different portions, for example, cutting out the particular portion of the electrode, and then subjecting the separated portion to differential weight analysis (e.g., weighing the initial portion, removing the electrode active material, and then weighing that portion again to determine the amount of electrode active material, as described herein). Alternatively, the amount of electrode active material within a given portion of the electrode may be determined via scanning electron microscopy (SEM).

In accordance with some embodiments, the surface-area-normalized amount of electrode active material may decrease within the edge region of the second electrode, in at least one direction from the inner boundary, through the edge region, toward and to the edge of the electrode. For example, referring to FIG. 5, in some embodiments, the surface-area-normalized amount of electrode active material may decrease within edge region 560 of second electrode 500, in at least one direction from inner boundary 552 of edge region 560, through edge region 560, toward and to edge 565 of second electrode 500. An example of one such direction is indicated by dotted line 563b in FIG. 5. In some embodiments, a plot of the surface-area-normalized amount of electrode active material as a function of distance along line segment 563b would show a decrease in the surface-area-normalized amount of electrode active material as one moves from the part of line segment 563b in contact with inner boundary 552, along line segment 563b, and toward and to the part of line segment 563b in contact with edge 565.

In some embodiments, the decrease in surface-area-normalized amount of electrode active material, in at least one direction from the inner border of the edge region, through the edge region, toward and to the edge of the second electrode, may be substantially continuous. In some embodiments, the decrease in surface-area-normalized amount of electrode active material, in at least one direction from the inner border of the edge region, through the edge region, toward and to the edge of the second electrode, may be linear, as exemplified in FIG. 13A. In some embodiments, the decrease in surface-area-normalized amount of electrode active material, in at least one direction from the inner border of the edge region, through the edge region, toward and to the edge of the second electrode, may be monotonic. In some embodiments, the decrease in value of the surface-area-normalized amount of electrode active material within the edge region is such that the value at the edge of the electrode is less than the value at the inner border of the edge region, and there is no segment in the edge region that occupies 10% of the width of the edge region and within which the value of the surface-area normalized amount of electrode active material changes, across the width of the segment, by less than 2% (or less than 5%) of the value of the surface-area normalized amount of electrode active material at the inner border of the edge region. In some embodiments, the rate of change of the decrease in surface-area-normalized amount of electrode active material, in at least one direction from the inner border of the edge region, through the edge region, toward and to the edge of the second electrode, may decrease monotonically (i.e. the profile of the amount of electrode active material may be concave up), as exemplified in FIG. 13B. In some embodiments, the rate of change of the decrease in surface-area-normalized amount of electrode active material, in at least one direction from the inner border of the edge region, through the edge region, toward and to the edge of the second electrode, may increase monotonically (i.e. the profile of the amount of electrode active material may be concave down), as exemplified in FIG. 13C. In some embodiments, the surface-area-normalized amount of electrode active material at the edge of the electrode is at least 40% less than the surface-area-normalized amount of electrode active material at the inner border of the edge region. In some embodiments, the rate of change of the surface-area-normalized amount of electrode active material, in at least one direction from the inner border of the edge region, through the edge region, toward and to the edge of the second electrode, is substantially continuous.

Any of the profiles for surface-area-normalized amount of electrode active material in the edge region described above may be accomplished through spatially varying, in at least one direction from the inner border of the edge region, through the edge region, toward and to the edge of the electrode, the application of any technique capable of reducing the amount of electrode active material. Such techniques could include, but are not limited to, changing the thickness of the electrode, chemical or electrochemical removal of electrode active material, or any other technique for reducing the amount of electrode active material.

Generally, electrochemical reactions are facilitated by an electrolyte, which can contain free ions and can behave as an electrically conductive medium. The performance of an electrochemical cell can be enhanced by employing porous electrodes thereby increasing the amount of contact between an electrode active material and the electrolyte), which can lead to an increase in the rate of the electrochemical reaction within the cell. Further description and definition of the porous nature of electrodes, according to some embodiments, is included further below.

According to one or more embodiments, at least one surface-area-normalized pore volume (defined in units of, for example, $cm^3/cm^2$, or cm) in an edge region of the second electrode (e.g., cathode) is less than a surface-area-normalized pore volume in a central region of the second electrode (e.g., cathode). According to one or more embodiments, at least one surface-area-normalized pore volume in the edge region has a value of less than 50%, 45%, 40%, 35,%, 30%, or 25% of at least one surface-area-normalized pore volume in the central region. In some embodiments, the edge region may be defined as the outer 5%, 10%, 15%, 20%, or 25% of the second electrode, while the central region may be defined as the central 95%, 90%, 85%, 80%, or 75%, respectively, of the second electrode. For such embodiments, the edge region and central region of the electrode may be defined according to any of the values discussed above for those regions.

According to one or more embodiments, the edge-region-normalized pore volume of the edge region of the second electrode is less than the central-area-normalized pore volume of the central region of the second electrode. According to one or more embodiments, the edge-region-normalized pore volume of the edge region of the second electrode has a value of less than 80%, 75%, 70%, 65,%, 60%, or 55% of the central-area-normalized pore volume of the central region of the second electrode. Such a reduction in pore volume from the central region to the edge region may prevent or aid in preventing over-utilization in the edge regions of an electrode. For such embodiments, the edge region and central region of the electrode may be defined according to any of the values discussed above for those regions.

In accordance with some embodiments, the surface-area-normalized pore volume may decrease within the edge region of the second electrode, in at one least direction from the inner boundary, through the edge region, toward and to the edge of the electrode. For example, referring to FIG. 5, in some embodiments, the surface-area-normalized pore volume may decrease within edge region 560 of second electrode 500, in at least one direction from inner boundary 552 of edge region 560, through edge region 560, toward and to edge 565 of second electrode 500. An example of one such direction is indicated by dotted line 563*b* in FIG. 5. In some embodiments, a plot of the surface-area-normalized pore volume as a function of distance along line segment 563*b* would show a decrease in the surface-area-normalized pore volume as one moves from the part of line segment 563*b* in contact with inner boundary 552, along line segment 563*b*, and toward and to the part of line segment 563*b* in contact with edge 565.

In some embodiments, the decrease in surface-area-normalized pore volume, in at least one direction from the inner border of the edge region, through the edge region, toward and to the edge of the second electrode, may be substantially continuous. In some embodiments, the decrease in surface-area-normalized pore volume, in at least one direction from the inner border of the edge region, through the edge region, toward and to the edge of the second electrode, may be linear, as exemplified in FIG. 13A. In some embodiments, the decrease in surface-area-normalized pore volume, in at least one direction from the inner border of the edge region, through the edge region, toward and to the edge of the second electrode, may be monotonic. In some embodiments, the decrease in value of the surface-area-normalized pore volume within the edge region is such that the value at the edge of the electrode is less than the value at the inner border of the edge region, and there is no segment in the edge region that occupies 10% of the width of the edge region and within which the value of the surface-area normalized pore volume changes, across the width of the segment, by less than 2% (or less than 5%) of the value of the surface-area normalized pore volume at the inner border of the edge region. In some embodiments, the rate of change of the decrease in surface-area-normalized pore volume, in at least one direction from the inner border of the edge region, through the edge region, toward and to the edge of the second electrode, may decrease monotonically (i.e. the profile of the pore volume may be concave up), as exemplified in FIG. 13B. In some embodiments, the rate of change of the decrease in surface-area-normalized pore volume, in at least one direction from the inner border of the edge region, through the edge region, toward and to the edge of the second electrode, may increase monotonically (i.e. the profile of the pore volume may be concave down), as exemplified in FIG. 13C. In some embodiments, the surface-area-normalized pore volume at the edge of the electrode is at least 40% less than the surface-area-normalized pore volume at the inner border of the edge region. In some embodiments, the rate of change of the surface-area-normalized pore volume, in at least one direction from the inner border of the edge region, through the edge region, toward and to the edge of the second electrode, is substantially continuous.

Any of the profiles for surface-area-normalized pore volume in the edge region described above may be accomplished through spatially varying, in at least one direction from the inner border of the edge region, through the edge region, toward and to the edge of the electrode, the application of any technique capable of reducing porosity. Such techniques could include, but are not limited to, selectively impregnating pores of the electrode with a coating or filler, compression of the electrode particles so that the pores sizes decrease, or any other cause of reduction in porosity.

According to one or more embodiments, a second electrode (e.g., cathode) may be tapered in an edge region. The direction of tapering may be from the inner surface of the second electrode (i.e., the surface facing the first electrode) and toward an outer edge of the electrode at the outer surface of the second electrode (i.e., the surface opposite to the first electrode). In other words, the thickness of the electrode may decrease in the direction moving away from the central region toward the edge, beginning at some distance from the edge. According to one or more embodiments, the act of tapering the electrode in the edge region may facilitate the reduction of a normalized value of any of the accessible capacity, the amount of second electrode material, or the pore volume, as discussed above.

Figure 2A:
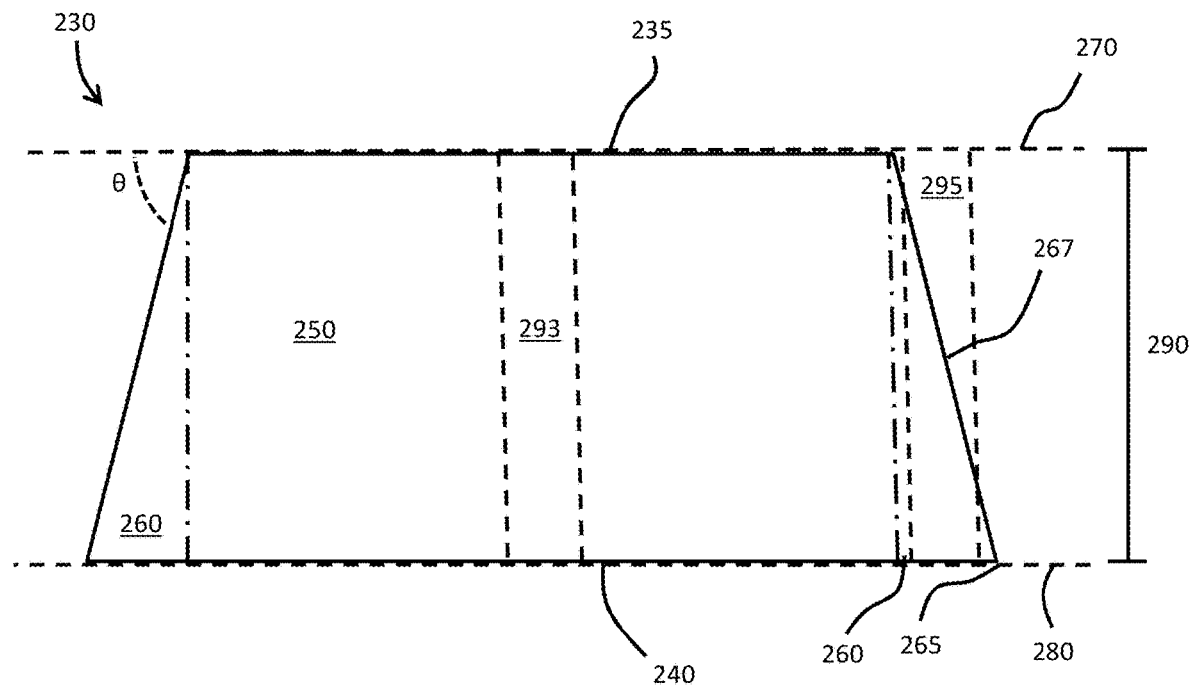
FIG. 2A shows a side view of an electrode, according to one or more embodiments.
Figure 2B:
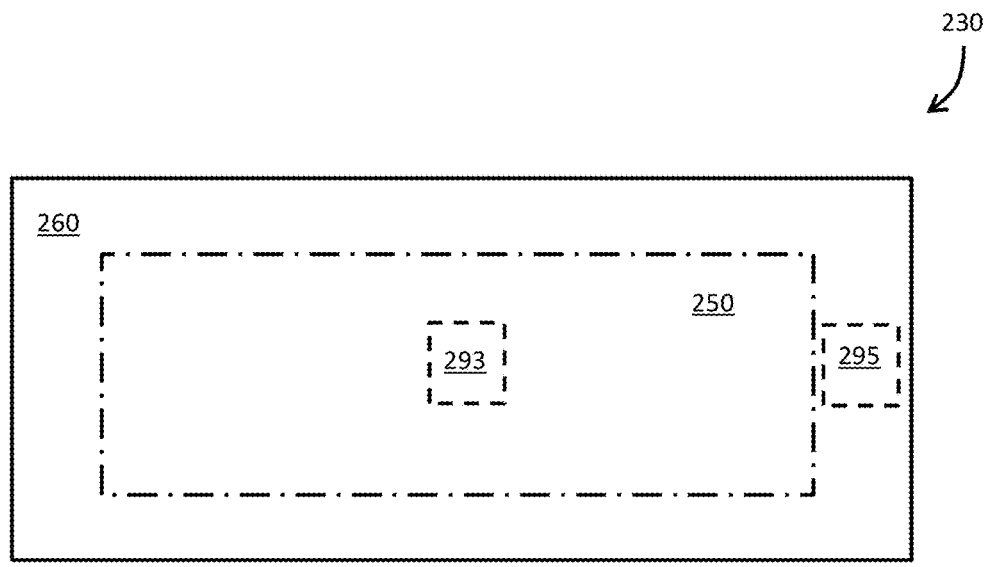
FIG. 2B shows a top view of an electrode, according to one or more embodiments.

An example of tapering is shown in the embodiment illustrated in FIGS. 2A and 2B. In FIGS. 2A and 2B a second electrode (e.g., cathode) 230 has an edge region 260 and a central region 250. The second electrode (e.g., cathode) 230 has a first surface 235 which faces the first electrode (e.g., anode) in the electrochemical cell and that is in the geometrical plane 270. The second electrode 230 also comprises a second surface 240 that faces away from the first electrode in the electrochemical cell and that is in the geometrical plane 280. The planes 270 and 280 are parallel and separated by a distance or height 290. Surface-area-normalized volumes 293 or 295 are the volumes arrived at by extending a pre-defined contiguous square area (e.g., 0.01 mm$^2$) in the plane 280 by the height 290.

The second electrode 230 has a tapered edge 267 which tapers outwardly to an outermost point 265 from the first surface 235 toward the second surface 240. The electrode 230 is tapered in an edge region 260. Tapering the edge of the cathode 230 may prevent the formation of a sharp step and over-utilization of a first electrode active material in a portion of the anode opposite to the edge region 260 of the cathode.

Tapering an edge of the cathode may result in at least one surface-area-normalized accessible capacity within the edge region being less than at least one surface-area-normalized accessible capacity within the central region, with the percentage in reduction being any of the values discussed above, according to one or more embodiments. Tapering an edge of the cathode may result in the edge-region-normalized accessible capacity within the edge region being less than at least one central-region-normalized accessible capacity within the central region, with the percentage in reduction being any of the values discussed above, according to one or more embodiments. For such embodiments, the edge region and central region of the electrode may be defined according to any of the values discussed above for those regions.

Tapering an edge of the cathode may result in at least one surface-area-normalized amount of second electrode active material within the edge region being less than at least one surface-area-normalized amount of second electrode active material within the central region, with the percentage in reduction being any of the values discussed above, according to one or more embodiments. Tapering an edge of the cathode may result in the edge-region-normalized amount of second electrode active material within the edge region being less than at least one central-region-normalized amount of second electrode active material within the central region, with the percentage in reduction being any of the values discussed above, according to one or more embodiments. For such embodiments, the edge region and central region of the electrode may be defined according to any of the values discussed above for those regions.

Tapering an edge of the cathode may result in at least one surface-area-normalized pore volume within the edge region being less than at least one surface-area-normalized pore volume within the central region, with the percentage in reduction being any of the values discussed above, according to one or more embodiments. Tapering an edge of the cathode may result in the edge-region-normalized pore volume within the edge region being less than at least one central-region-normalized pore volume within the central region, with the percentage in reduction being any of the values discussed above, according to one or more embodiments. For such embodiments, the edge region and central region of the electrode may be defined according to any of the values discussed above for those regions.

Tapering may be accomplished through a variety of manufacturing methods. In some embodiments, the edge region may be tapered by scraping off the steep edge of the cathode to create a gradient. In some embodiments, the edge region may be tapered by using an angled cut when punching out the electrodes prior to cell assembly.

According to one or more embodiments, the tapering creates an angled edge, relative to surface 240, rather than a perpendicular edge. In some embodiments. The angle of tapering, represented by θ in FIG. 2A, may be at least 10°, 20°, 30°, 40°, 50°, 60°, or 70°. In some embodiments, the angle of tapering, may be less than or equal to 80°, 70°, 60°, 50°, 40°, 30°, or 20°. Combinations of these values are also possible (e.g., at least 30° and less than or equal to 60°). In some embodiments, tapering may result in the thickness of the electrode decreasing monotonically from a position that is at least 1%, 2%, 4%, 6%, 8%, or 10% of the way away from the edge to the edge. Other values are also possible.

In accordance with some embodiments, the thickness of the electrode may decrease within the edge region of the second electrode, in at least one direction from the inner boundary, through the edge region, toward and to the edge of the electrode. For example, referring to FIG. 5, in some embodiments, the thickness of the electrode may decrease within edge region 560 of second electrode 500, in at least one direction from inner boundary 552 of edge region 560, through edge region 560, toward and to edge 565 of second electrode 500. An example of one such direction is indicated by dotted line 563b in FIG. 5. In some embodiments, a plot of the thickness of the electrode as a function of distance along line segment 563b would show a decrease in the surface-area-normalized pore volume as one moves from the part of line segment 563b in contact with inner boundary 552, along line segment 563b, and toward and to the part of line segment 563b in contact with edge 565.

In some embodiments, the decrease in thickness of the electrode, in at least one direction from the inner border of the edge region, through the edge region, toward and to the edge of the second electrode, may be substantially continuous. In some embodiments, the decrease in thickness of the electrode, in at least one direction from the inner border of the edge region, through the edge region, toward and to the edge of the second electrode, may be linear, as exemplified in FIG. 13A. In some embodiments, the decrease in thickness of the electrode, in at least one direction from the inner border of the edge region, through the edge region, toward and to the edge of the second electrode, may be monotonic. In some embodiments, the decrease in thickness of the electrode within the edge region is such that the value at the edge of the electrode is less than the value at the inner border of the edge region, and there is no segment in the edge region that occupies 10% of the width of the edge region and within which the value of the thickness of the electrode changes, across the width of the segment, by less than 2% (or less than 5%) of the value of the thickness of the electrode at the inner border of the edge region. In some embodiments, the rate of change of the decrease in thickness of the electrode, in at least one direction from the inner border of the edge region, through the edge region, toward and to the edge of the second electrode, may decrease monotonically (i.e. the profile of the thickness of the electrode may be concave up), as exemplified in FIG. 13B. In some embodiments, the rate of change of the decrease in thickness of the electrode, in at least one direction from the inner border of the edge region, through the edge region, toward and to the edge of the second electrode, may increase monotonically (i.e. the profile of the pore volume may be concave down), as exemplified in FIG. 13C. In some embodiments, the thickness of the electrode at the edge of the electrode is at least 40% less than the thickness of the electrode at the inner border of the edge region. In some embodiments, the rate of change of the thickness of the electrode, in at least one direction from the inner border of the edge region, through the edge region, toward and to the edge of the second electrode, is substantially continuous.

Any of the profiles for thickness of the electrode in the edge region described above may be accomplished through spatially varying, in at least one direction from the inner border of the edge region, through the edge region, toward and to the edge of the electrode, the application of any technique capable of the reducing the thickness. Such techniques could include, but are not limited to, scraping the electrode in the edge region, using angled cuts when punching out the electrodes prior to cell assembly, or any other cause of reduction in thickness of the electrode.

According to one or more embodiments, a coating may be applied to the second electrode (e.g., cathode) in an edge region. The coating may fill in a portion of the pores in the edge region, resulting in a corresponding reduction in pore volume in the edge region. Such a reduction in pore volume may prevent over-utilization of a first electrode active material in a portion of the first electrode (e.g., anode) opposite to the edge region of the second electrode (e.g., cathode). According to one or more embodiments, the act of coating the electrode in the edge region may facilitate the reduction of a normalized value of the accessible capacity, the conductivity, the pore volume, or the electrolyte uptake, as discussed above.

Figure 3A:
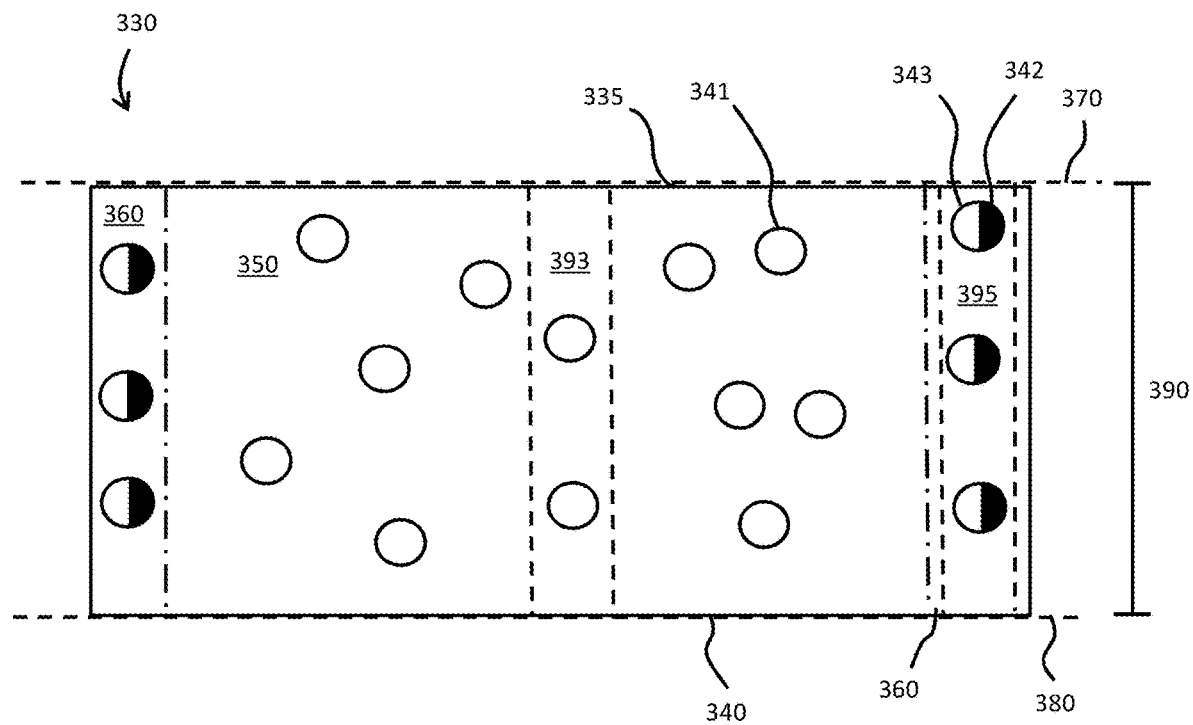
FIG. 3A shows a side view of an electrode, according to one or more embodiments.
Figure 3B:
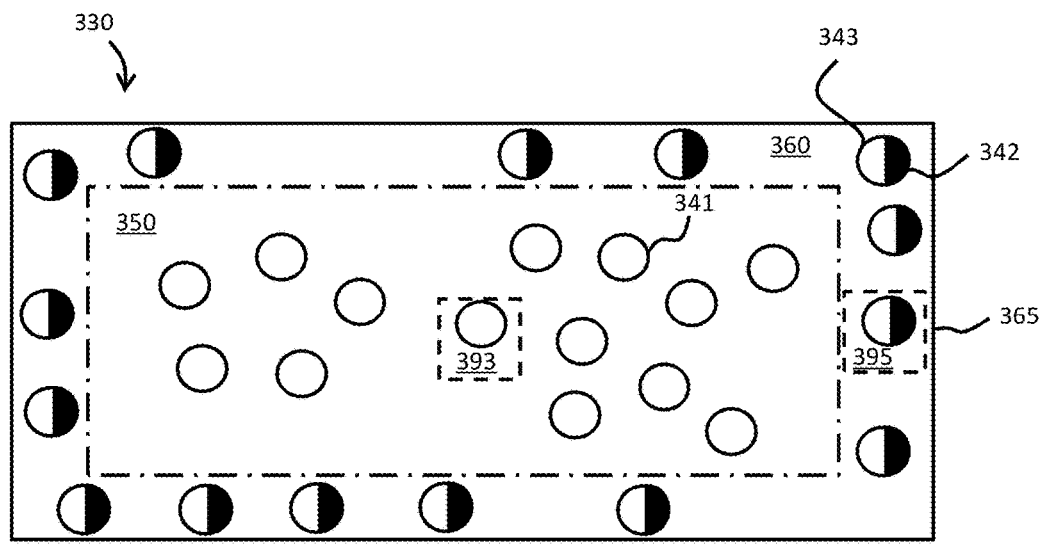
FIG. 3B shows a top view of an electrode, according to one or more embodiments.

An example of coating is shown in the embodiment illustrated in FIGS. 3A and 3B. In FIGS. 3A and 3B, the second electrode (e.g., cathode) 330 comprises a central region 350 and an edge region 360. The second electrode 330 has a first surface 335 which faces the first electrode (e.g., anode) in the electrochemical cell and that is in the geometrical plane 370. The second electrode 330 also comprises a second surface 340 that faces away from the first electrode in the electrochemical cell and that is in the geometrical plane 380. The planes 370 and 380 are parallel and separated by a distance or height 390. Surface-area-normalized volumes 393 or 395 are the volumes arrived at by extending a pre-defined contiguous square area (e.g., 0.01 $mm^2$) in the plane 380 to the height 390.

The central region 360 comprises a plurality of pores 341 in which electrolytic material may be present. The edge region 340 comprises a plurality of pores 343 whose volume has been reduced by coating material 342, and therefore have a reduced volume and a reduced capacity for electrolytic material. While the pores 343 of the edge region 360 are each shown as half-filled with coating material 342 in FIGS. 3A and 3B, in practice, the amount of coating material 342 in each pore 343 will vary, with some pores 343 being completely filled and others receiving no material 342.

Applying a coating to an edge region of the second electrode (e.g., cathode) may result in at least one surface-area-normalized accessible capacity or conductivity within the edge region being less than at least one surface-area-normalized accessible capacity or conductivity within the central region, with the percentage in reduction being any of the values discussed above, according to one or more embodiments. Applying a coating to an edge region of the second electrode (e.g., cathode) may result in the edge-region-normalized accessible capacity or conductivity within the edge region being less than at least one central-region-normalized accessible capacity or conductivity within the central region, with the percentage in reduction being any of the values discussed above, according to one or more embodiments. For such embodiments, the edge region and central region of the electrode may be defined according to any of the values discussed above for those regions.

Applying a coating to an edge region of the second electrode (e.g., cathode) may result in at least one surface-area-normalized pore volume within the edge region being less than at least one surface-area-normalized pore volume within the central region, with the percentage in reduction being any of the values discussed above, according to one or more embodiments. Applying a coating to an edge region of the second electrode (e.g., cathode) may result in the edge-region-normalized pore volume within the edge region being less than at least one central-region-normalized pore volume within the central region, with the percentage in reduction being any of the values discussed above, according to one or more embodiments. For such embodiments, the edge region and central region of the electrode may be defined according to any of the values discussed above for those regions.

The coating or filler material may be a polymer. The coating material may be electrochemically stable within the cell operating voltage window. The coating material may be not reactive with electrolyte. The coating material may be non-soluble or not swollen in the electrolyte (i.e., minimum to no electrolyte uptake). Examples of polymers (e.g., cross-linked polymers) suitable for the coating include but are not limited to polyisobutenes; polyimide; thermoplastic or cross-linked polymer of EPDM (ethylene propylene diene monomer); PVDF (polyvinylidene fluoride) with or without hexafluoropropylene (HFP) copolymer; polyvinyl alcohol; copolymers of ethylene, ethylene propylene diene terpolymer (EP(D)M); and silicone polymers (polymerized siloxanes like polydimethyl siloxane, or PDMS); and combination of these polymers. In some embodiments, the coating or filler material may be a wax or inorganic material.

According to certain embodiments, at least one surface-area normalized electrolyte uptake in an edge region of the second electrode is less than a surface-area-normalized electrolyte uptake in a central region of the electrode.

As used herein, the electrolyte uptake of an electrode is a measure of the amount of electrolyte absorbed by the electrode (including amounts absorbed by coating(s) present within the electrode).

The electrolyte uptake of the electrode in a given region may be affected, in accordance with certain embodiments, by the degree to which an applied coating or filler is able to be wetted by the electrolyte (i.e., absorb or be swollen with electrolyte). In other words, a region of the electrode comprising a coating that is highly wettable by the electrolyte components will generally have a greater surface-area normalized electrolyte uptake than that of a region comprising a coating that is not highly wettable by the electrolyte components, all other factors being equal. A coated region of an electrode with a high surface-area-normalized electrolyte uptake will generally have, all other factors being equal, a greater surface-area normalized accessible capacity, and therefore electrochemical activity, than a coated region of an electrode with a low surface-area-normalized electrolyte uptake. That is because coated electrode active material in the high electrolyte uptake region may still have access to the electrolyte and its dissolved conducting ions, due to the coating absorbing the electrolyte and therefore providing a conductive pathway. Conversely, electrode active material in a coated region of an electrode with a low electrolyte uptake (due to the coating have a poor electrolyte wettability or ability to absorb the electrolyte components) has reduced access to the electrolyte and its dissolved conducting ions, and therefore fewer conductive pathways.

According to certain embodiments, at least one surface-area normalized electrolyte uptake in the edge region of the second electrode has a value of less than 50%, 45%, 40%, 35,%, 30%, or 25% of at least one surface-area normalized electrolyte uptake in the central region. Such a reduction in electrolyte uptake from the central region to the edge may prevent or aid in preventing over-utilization in the edge regions of a first electrode. For such embodiments, the edge region and central region of an electrode may be defined according to any of the values discussed above for those regions.

According to certain embodiments, the edge-region-normalized electrolyte uptake of the edge region (e.g., region 160) of the second electrode is less than the central-area-normalized electrolyte uptake of the central region (e.g., region 150) of the second electrode. According to one or more embodiments, the edge-region-normalized electrolyte uptake of the edge region of the second electrode has a value of less than 80%, 75%, 70%, 65,%, 60%, or 55% of the central-area-normalized electrolyte uptake of the central region of the second electrode. Such a reduction in electrolyte uptake from the central region to the edge region may prevent or aid in preventing over-utilization in the edge regions of an electrode. For such embodiments, the edge region and central region of the electrode may be defined according to any of the values discussed above for those regions.

The electrolyte uptake of different portions within an electrode, such as an edge region or a central region or a portion within the edge region or central region, may be determined by infiltrating the electrode with electrolyte, evaporating the volatile components of the electrolyte (e.g., the solvent) leaving behind the non-volatile electrolyte components (e.g., salts) and determining the spatial variation in the abundance of non-volatile electrolyte component that remain within the electrode following evaporation of the volatile electrolyte component(s). For example, the local electrolyte uptake of a portion of electrode may be determined by submerging the electrode into an electrolyte solution, then removing it and letting the electrolyte solvent evaporate. The spatial variation in the abundance of the non-volatile electrolyte components remaining in the electrode can be measured at different locations on the electrode using energy-dispersive X-ray spectroscopy ("EDS") or Fourier-transform infrared spectroscopy ("FTIR").

In accordance with some embodiments, the surface-area-normalized electrolyte uptake may decrease within the edge region of the second electrode, in at least one direction from the inner boundary, through the edge region, toward and to the edge of the electrode. For example, referring to FIG. 5, in some embodiments, the surface-area-normalized electrolyte uptake may decrease within edge region 560 of second electrode 500, in at least one direction from inner boundary 552 of edge region 560, through edge region 560, toward and to edge 565 of second electrode 500. An example of one such direction is indicated by dotted line 563b in FIG. 5. In some embodiments, a plot of the surface-area-normalized electrolyte uptake as a function of distance along line segment 563b would show a decrease in the surface-area-normalized electrolyte as one moves from the part of line segment 563b in contact with inner boundary 552, along line segment 563b, and toward and to the part of line segment 563b in contact with edge 565.

In some embodiments, the decrease in surface-area-normalized electrolyte uptake, in at least one direction from the inner border of the edge region, through the edge region, toward and to the edge of the second electrode, may be substantially continuous. In some embodiments, the decrease in surface-area-normalized electrolyte uptake, in at least one direction from the inner border of the edge region, through the edge region, toward and to the edge of the second electrode, may be linear, as exemplified in FIG. 13A. In some embodiments, the decrease in surface-area-normalized electrolyte uptake, in at least one direction from the inner border of the edge region, through the edge region, toward and to the edge of the second electrode, may be monotonic. In some embodiments, the decrease in value of the surface-area-normalized electrolyte uptake within the edge region is such that the value at the edge of the electrode is less than the value at the inner border of the edge region, and there is no segment in the edge region that occupies 10% of the width of the edge region and within which the value of the surface-area normalized electrolyte uptake changes, across the width of the segment, by less than 2% (or less than 5%) of the value of the surface-area normalized electrolyte uptake at the inner border of the edge region. In some embodiments, the rate of change of the decrease in surface-area-normalized electrolyte uptake, in at least one direction from the inner border of the edge region, through the edge region, toward and to the edge of the second electrode, may decrease monotonically (i.e. the profile of the electrolyte uptake may be concave up), as exemplified in FIG. 13B. In some embodiments, the rate of change of the decrease in surface-area-normalized electrolyte uptake, in at least one direction from the inner border of the edge region, through the edge region, toward and to the edge of the second electrode, may increase monotonically (i.e. the profile of the electrolyte uptake may be concave down), as exemplified in FIG. 13C. In some embodiments, the surface-area-normalized electrolyte uptake at the edge of the electrode is at least 40% less than the surface-area-normalized electrolyte uptake at the inner border of the edge region. In some embodiments, the rate of change of the surface-area-normalized electrolyte uptake, in at least one direction from the inner border of the edge region, through the edge region, toward and to the edge of the second electrode, is substantially continuous.

Any of the profiles for surface-area-normalized electrolyte uptake in the edge region described above may be accomplished through spatially varying, in at least one direction from the inner border of the edge region, through the edge region, toward and to the edge of the electrode, the application of any technique capable of reducing electrolyte uptake. Such techniques could include, but are not limited to, coating the surface and impregnating the pores with a polymer or filler that has a poor ability to absorb or wet the electrolyte solvent. Any of the profiles for surface-area-normalized electrolyte uptake in the edge region mentioned above may also be accomplished through coating the edge region with a block-copolymer (see below). Any of the profiles for surface-area-normalized electrolyte uptake in the edge region mentioned above may also be accomplished through coating the edge region with a gradient copolymer (see below). Any of the profiles for surface-area-normalized electrolyte uptake in the edge region mentioned above may also be accomplished through controlling the distribution of polymer coating in the edge region using an external stimulus, as exemplified, but not limited to, exploiting the Marangoni Effect as described below.

In accordance with certain embodiments, the surface-area normalized electrolyte uptake (and, in some such cases, the accessible capacity), within the edge region of an electrode can be made to vary spatially (e.g., between the center region and the edge region and/or from the inner border of the edge region to the edge of the electrode) by coating the edge region (and/or, in some embodiments, the central region) with a copolymer comprising a portion with monomeric units having a high affinity (and therefore wettability) for the electrolyte and a portion with monomeric units having a low affinity (and therefore wettability) for the electrolyte. As one non-limiting example, if one arranges the copolymer so that the more wettable portion is proximate the inner border of the edge region and the less wettable portion is proximate the edge of the electrode, then electrolyte uptake would be lower near the edge than near the inner border of the edge region. As another non-limiting example, if one arranges the copolymer so that the more wettable portion is proximate the central region of the electrode and the less wettable portion is proximate the edge of the electrode, then electrolyte uptake would be lower near the edge than near the central region.

One example of a copolymer capable of varying the electrolyte uptake within the electrode is a block-copolymer comprising a portion having a high abundance of methylacrylate (MA) monomeric units (which have a high affinity for electrolyte components such as propylene carbonate) proximate the inner border and a portion having a high abundance of styrene (St) monomeric units (which have a poor affinity for propylene carbonate) proximate the outer edge.

In some embodiments, the electrolyte uptake within the electrode can be made to vary spatially (e.g., substantially continuously) using a gradient copolymer. A gradient copolymer comprises multiple monomeric units, the relative frequency of which gradually changes along the length of the polymer. The use of a gradient copolymer can, according to certain embodiments, assist with avoiding sharp domain boundaries between highly wettable and non-highly wettable portions. For example, a gradient copolymer comprising MA and St may have one end of the polymer chain with mostly MA monomeric units and few St units, but along the length of the chain the frequency of MA to St changes gradually until the copolymer has mostly St units and few MA units at the other end. Such an embodiment of a gradient copolymer would have greater uptake of electrolytes like propylene carbonate at the first end (with the higher abundance of MA units) than the second end (with the higher abundance of St units) due to the different wetting abilities of MA and St with respect to that electrolyte. One method for synthesizing a gradient copolymer of St and MA is the radical reversible addition fragmentation chain transfer (RAFT) polymerization method described in Zheng et al., Employing Gradient Copolymer to Achieve Gel Polymer Electrolytes with High Ionic Conductivity. Macromolecules. 2016; 49:2179-2188. The cathode edge region may then be wetted with electrolyte solvent, after which point the gradient copolymer product afforded by the aforementioned method may then be coated on to the cathode edge. The difference in affinity for the electrolyte solvent between the MA and St monomers will, in accordance with such embodiments, cause the gradient copolymer to segregate and assemble on the electrode in such a way that the end of the copolymer with a greater abundance of MA units will orient toward the wetted portion of the electrode, while the end of the copolymer with a greater abundance of St units will orient toward the unwetted portion of the electrode in the edge region. The cathode edge may then be heated (e.g., to a temperature in the range of from 30 to 50° C.) to enhance the segregation and to remove the electrolyte solvent.

In addition to the MA/St copolymers described above, other types of copolymer chain structures may be used to vary the electrolyte uptake across the electrode. For example, combinations of different monomers like MA and St arranged as random copolymers, triblock copolymers, and V-shape gradient polymers could be used. The monomers that may be included in the copolymers described above are not limited to MA and St; any combination of monomers for which there is a substantial difference in affinity for a given electrolyte may be used. Examples of such monomers include but are not limited to ethylene oxide, vinylidene difluoride, methyl methacrylate, urethane acrylate, vinyl acetate, tetrafluoroethylene, dimethylsiloxane, etc. The dependence of the affinity of a monomer for the electrolyte is generally determined by a number of factors, including the strength of intermolecular interactions (e.g., hydrogen bonding, electrostatic, van der Waals forces, etc.) between the monomer and the electrolyte. Modifying the monomer with different types of functional groups (e.g., polar, nonpolar, charged, aromatic, etc.) is one way to alter the affinity of a monomer for the electrolyte. Examples of such functional groups include but are not limited to nitrate, nitrite, hydroxyl, sulfonic acid, phosphate, alkyl groups with or without aliphatic groups (e.g., carbon chain length from 1 to 10), ester groups with fluorine or alkyl chains (e.g., carbon chain length from 1 to 10 or aliphatic), etc.

Another method for creating a variation of the surface-area-normalized electrolyte uptake within the electrode (e.g., within the edge region of the electrode) is to apply a non-uniform distribution of a polymer coating comprising one or more separate components. The distribution of the components can be controlled using the Marangoni Effect, whereby fluids flow from areas of low surface energy to areas of high surface energy. One way to create a coating in which a difference in surface energy exists is by applying two different liquid polymeric components, one of which comprises monomers modified with hydrophobic functional groups (e.g., methyl, carbonyl, epoxy, ketone, aldehyde, etc.), and the other of which comprises monomers modified with hydrophilic functional groups (e.g., hydroxyl, amine, carboxylic acid, phosphonate, sulfonate, amide, polysaccharide, sulfhydryl, etc.). The difference in surface energy, and therefore the extent of intermixing between the two components, can be controlled with the application of an external stimulus (e.g., change in temperature, change in pH, electric field, magnetic field, light, gravity, addition of a chemical such as a surfactant, etc.), thereby allowing for one to tune the gradient in distribution of the coating. A second way to exploit the Marangoni Effect to create a non-uniform distribution of a coating on the electrode (e.g., in the edge region of the electrode) is to apply a single component polymer coating on the edge region, and then irradiate a select portion of the edge region with UV light while using a photo mask to prevent the rest of the edge region from being exposed to the light. If the polymer in the coating undergoes a photo-driven transformation, then a different in surface energy between the exposed and unexposed areas can be achieved. For example, polystyrene can undergo photochemical dehydrogenation of its backbone under UV irradiation to create a stilbene-like photoproduct that has a higher surface energy than the polystyrene, as described in Katzenstein et al., Patterning by Photochemically Directing the Marangoni Effect, ACS Macro Letters. 2012; 1:1150-1154. By coating the edge region of the electrode with polystyrene and selectively irradiating a portion of it, the unexposed polystyrene will flow to the exposed area, creating a gradient in coating coverage and therefore a gradient in wettability and surface-area-normalized electrolyte uptake.

According to one or more embodiments, the second electrode (e.g., cathode) may be compressed in an edge region. According to one or more embodiments, the act of compressing the electrode in the edge region may facilitate the reduction of a normalized value of the accessible capacity or the pore volume, as discussed above.

Figure 4A:
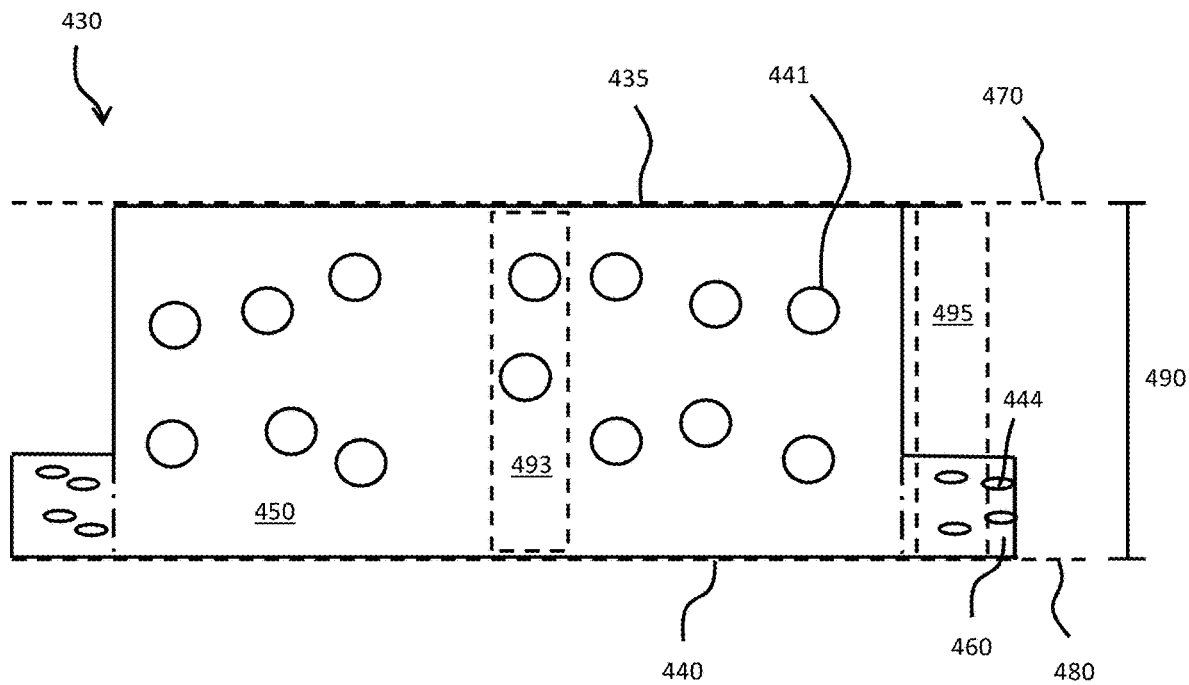
FIG. 4A shows a side view of an electrode, according to one or more embodiments.
Figure 4B:
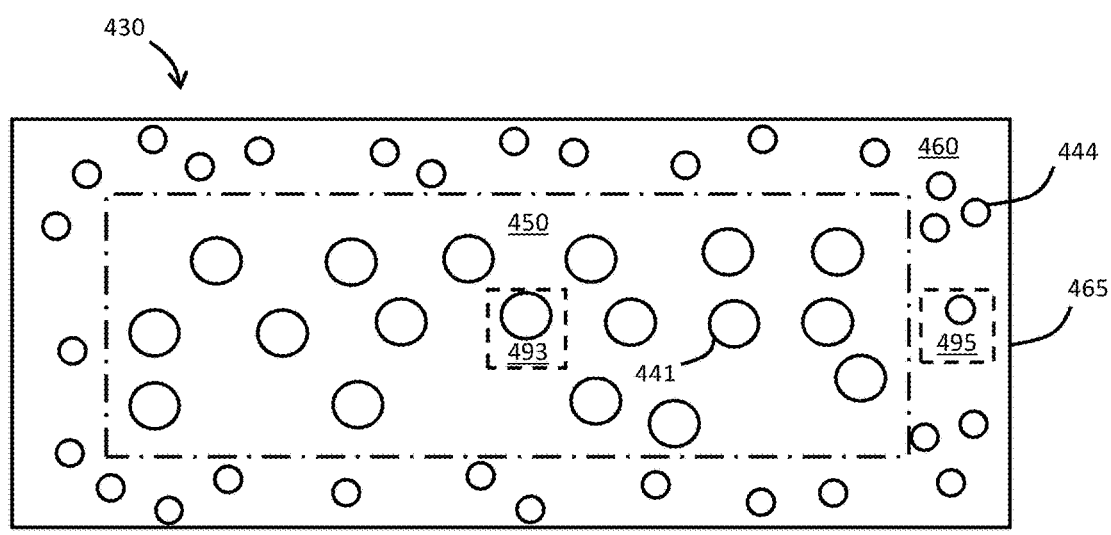
FIG. 4B shows a top view of an electrode, according to one or more embodiments.

An example of compression is shown in the embodiment illustrated in FIGS. 4A and 4B. In FIGS. 4A and 4B, the second electrode (e.g., cathode) 430 comprises a central region 450 and an edge region 460. The second electrode 430 has a first surface 435 which faces the first electrode (e.g., anode) in the electrochemical cell and that is in the geometrical plane 470. The second electrode 430 also comprises a second surface 440 that faces away from the first electrode in the electrochemical cell and that is in the geometrical plane 480. The planes 470 and 480 are parallel and separated by a distance or height 490. Surface-area-normalized volumes 493 or 495 are the volumes arrived at by extending a pre-defined contiguous square area (e.g., 0.01 $mm^2$) in the plane 480 by the height 490.

The central region 460 comprises a first plurality of pores 441 in which electrolytic material may be present. The edge region 460 comprises a second plurality of pores 444 whose volume has been reduced by compression, and therefore have a reduced pore volume and a reduced capacity for electrolytic material. While the compression is shown as a uniform step reduction in FIGS. 4A and 4B, it should be understood that compression could also result in a sloped edge region having a geometry similar to that shown for the edge region 260 in FIG. 2A.

Compressing an edge region of the second electrode (e.g., cathode) may result in at least one surface-area-normalized accessible capacity within the edge region being less than at least one surface-area-normalized accessible capacity within the central region, with the percentage in reduction being any of the values discussed above, according to one or more embodiments. Compressing an edge region of the second electrode (e.g., cathode) may result in the edge-region-normalized accessible capacity within the edge region being less than at least one central-region-normalized accessible capacity within the central region, with the percentage in reduction being any of the values discussed above, according to one or more embodiments. For such embodiments, the edge region and central region of the electrode may be defined according to any of the values discussed above for those regions.

Compressing an edge region of the second electrode (e.g., cathode) may result in at least one surface-area-normalized pore volume within the edge region being less than at least one surface-area-normalized pore volume within the central region, with the percentage in reduction being any of the values discussed above, according to one or more embodiments. Compressing an edge region of the second electrode (e.g., cathode) may result in the edge-region-normalized pore volume within the edge region being less than at least one central-region-normalized pore volume within the central region, with the percentage in reduction being any of the values discussed above, according to one or more embodiments. For such embodiments, the edge region and central region of the electrode may be defined according to any of the values discussed above for those regions.

In some embodiments, compression may be accomplished during manufacture by utilizing a punch press having a step where the outer edge cuts the electrode and the inner step compresses the edge region.

Electrode active materials are those materials associated with an electrode and which participate in the electrochemical reaction(s) of the electrochemical cell that generate electrical current. Cathode active materials are electrode active materials associated with the cathode of the electrochemical cell, and anode active materials are electrode active materials associated with the anode of the electrochemical cell.

As used herein, "cathode" refers to the electrode in which an electrode active material is oxidized during charging and reduced during discharging, and "anode" refers to the electrode in which an electrode active material is reduced during charging and oxidized during discharging.

A variety of anode active materials are suitable for use with anodes of the electrochemical cells described herein, according to certain embodiments. In some embodiments, the anode active material comprises lithium (e.g., lithium metal), such as lithium foil, lithium deposited onto a conductive substrate, and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin.

In some embodiments, the anode active material contains at least 50 wt % lithium. In some cases, the anode active material contains at least 75 wt %, at least 90 wt %, at least 95 wt %, or at least 99 wt % lithium.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In certain cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In certain embodiments, the anode active material comprises silicon, lithium, and/or any alloys of combinations thereof. In certain embodiments, the anode active material comprises lithium titanate ($Li_4Ti_5O_{12}$, also referred to as "LTO"), tin-cobalt oxide, or any combinations thereof.

According to some embodiments, an electrode (e.g., lithium anode) of the electrochemical cell may comprise one or more coatings or layers formed from polymers, ceramics, and/or glasses. The coating may serve as a protective layer and may serve different functions. Those functions may include preventing the formation of dendrites during recharging which could otherwise cause short circuiting, preventing reaction of the electrode active material with electrolyte, and improving cycle life. Examples of such protective layers include those described in: U.S. Pat. No. 8,338,034 to Affinito et al. and U.S. Patent Publication No. 2015/0236322 to Laramie at al., each of which is incorporated herein by reference in its entirety for all purposes.

Figure 6:
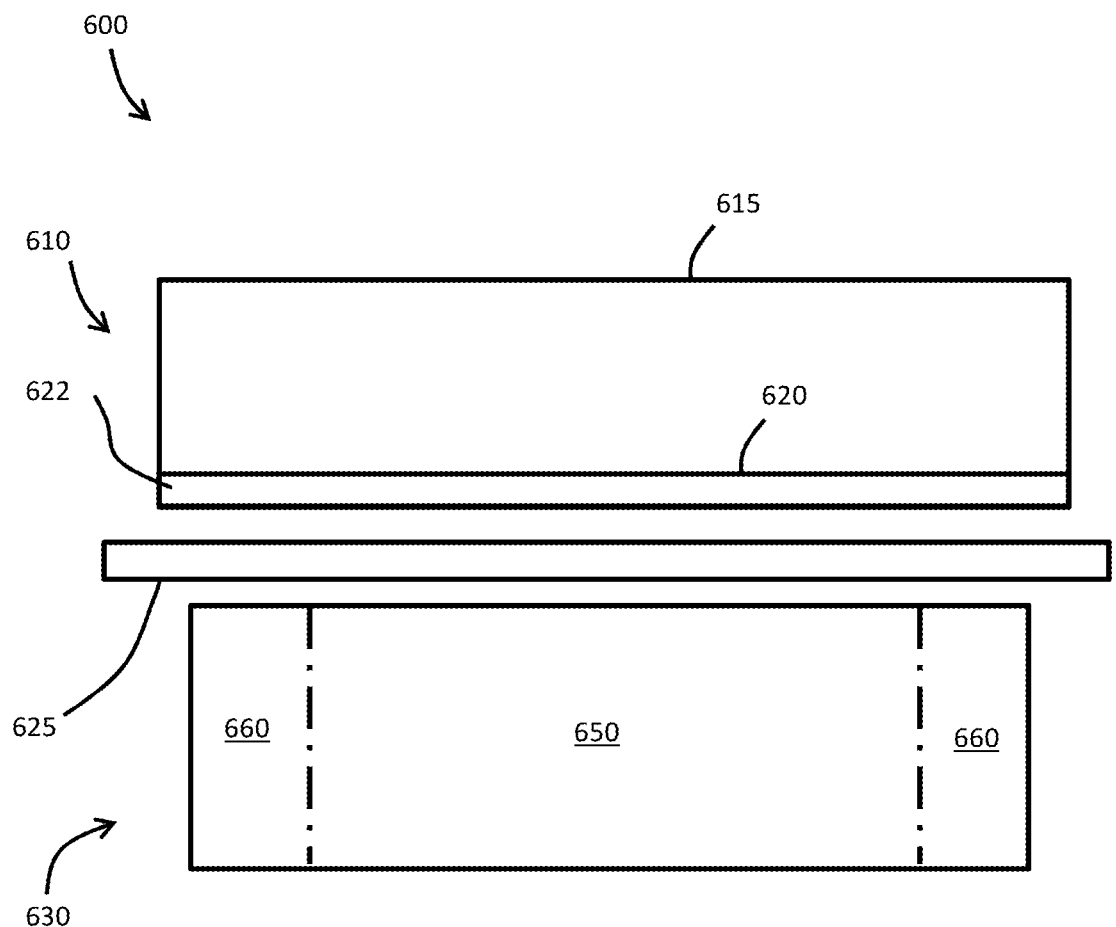
FIG. 6 shows a side view of an electrochemical cell, according to one or more embodiments.

For example, FIG. 6 shows an electrochemical cell 600 according to one or more embodiments that comprises a first electrode, or anode, 610, a separator 625, and a second electrode, or cathode, 630. The cathode 630 comprises a central region 650 and an edge region 660 as discussed elsewhere. The anode 610 comprises an outer surface 615 opposite to the separator 625 and the cathode 630. The anode further comprises an inner surface 620 facing the separator 625 and the cathode 630. A coating 622 is deposited on the surface 620 of the anode 610 to serve as a protective layer.

Layers of ceramic or other inorganic protective materials (e.g., glasses, glassy-ceramics) may be used to protect electrodes (e.g., lithium anodes) from adverse interaction with electrolyte material during operation of electrochemical cells. For example, protected lithium anode (PLA) structures may be employed.

A protective layer described herein can be formed of a variety of types of materials. In certain embodiments, the material from which the protective layer is formed may be selected to allow ions (e.g., electrochemically active ions, such as lithium ions) to pass through but to substantially impede electrons from passing across. By "substantially impedes", in this context, it is meant that in this embodiment the material allows lithium ion flux at least ten times greater than electron passage.

In some embodiments, the material used for protective layer has a high enough conductivity (e.g., at least $10^{-6}$ S/cm, or another conductivity value described herein) in its first amorphous state. The material may also be chosen for its ability to form a smooth, dense and homogenous thin films, especially on a polymer layer such as a separator. Lithium oxysulfides may especially include these characteristics.

The protective layer can be configured to be substantially electronically non-conductive, in certain embodiments, which can inhibit the degree to which the ion conductor causes short circuiting of the electrochemical cell. In certain embodiments, all or part of the protective layer can be formed of a material with a bulk electronic resistivity of at least about $10^4$ Ohm-meters, at least about $10^5$ Ohm-meters, at least about $10^{10}$ Ohm-meters, at least about $10^{15}$ Ohm-meters, or at least about $10^{20}$ Ohm-meters. The bulk electronic resistivity may be, in some embodiments, less than or equal to about $10^{20}$ Ohm-meters, or less than or equal to about $10^{15}$ Ohm-meters. Combinations of the above-referenced ranges are also possible. Other values of bulk electronic resistivity are also possible.

In some embodiments, the average ionic conductivity (e.g., lithium ion conductivity) of the protective layer material is at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, at least about $10^{-1}$ S/cm, at least about 1 S/cm, or at least about 10 S/cm. The average ionic conductivity may be less than or equal to about 20 S/cm, less than or equal to about 10 S/cm, or less than or equal to 1 S/cm. Conductivity may be measured at room temperature (e.g., 25 degrees Celsius).

In some embodiments, the protective layer can be a solid. In some embodiments, the protective layer comprises or may be substantially formed of a non-polymeric material. For example, the protective layer may comprise or may be substantially formed of an inorganic material.

Although a variety of materials can be used as an ion conductive layer, in one set of embodiments, the protective layer is an inorganic ion conductive layer. For example, the inorganic ion conductor layer may be a ceramic, a glass, or a glassy-ceramic. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. Protective layers may include a glassy material selected from one or more of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. In some embodiments, the protective layer comprises an oxysulfide such as lithium oxysulfide. In one embodiment, the protective layer comprises a lithium phosphorus oxynitride in the form of an electrolyte.

In certain embodiments in which an inorganic ion conductor material described herein comprises a lithium oxysulfide, the lithium oxysulfide (or an ion conductor layer comprising a lithium oxysulfide) may have an oxide content between 0.1-20 wt %. The oxide content may be measured with respect to the total weight of the lithium oxysulfide material or the total weight of the ion conductor layer that comprises the lithium oxysulfide material. For instance, the oxide content may be at least 0.1 wt %, at least 1 wt %, at least 2 wt %, at least 5 wt %, at least 10 wt %, %, at least 15 wt %, or at least 20 wt %. In some embodiments, the oxide content may be less than or equal to 20 wt %, less than or equal to 15 wt %, less than or equal to 10 wt %, less than or equal to 5 wt %, less than or equal to 2 wt %, or less than or equal to 1 wt % of the lithium oxysulfide. Combinations of the above-noted ranges are also possible. The elemental composition, including oxide content, of a layer may be determined by methods such as energy-dispersive X-ray spectroscopy.

In some embodiments in which an inorganic ion conductor material described herein comprises a lithium oxysulfide, the lithium oxysulfide material (or an ion conductor layer comprising a lithium oxysulfide) has an atomic ratio of sulfur atoms to oxygen atoms (S:O) of between, for example, 0.5:1 to 1000:1. For instance, the atomic ratio between sulfur atoms to oxygen atoms (S:O) in the lithium oxysulfide material (or an ion conductor layer comprising a lithium oxysulfide) may be at least 0.5:1, at least 0.667:1, at least 1:1, at least 2:1, at least 3:1, at least 4:1, at least 5:1, at least 10:1, at least 20:1, at least 50:1, at least 70:1, at least 90:1, at least 100:1, at least 200:1, at least 500:1, or at least 1000:1. The atomic ratio of sulfur atoms to oxygen atoms (S:O) in the lithium oxysulfide material (or an ion conductor layer comprising a lithium oxysulfide) may be less than or equal to 1000:1, less than or equal to 500:1, less than or equal to 200:1, less than or equal to 100:1, less than or equal to 90:1, less than or equal to 70:1, less than or equal to 50:1, less than or equal to 20:1, less than or equal to 10:1, less than or equal to 5:1, less than or equal to 3:1, or less than or equal to 2:1. Combinations of the above-noted ranges are also possible (e.g., an atomic ratio of S:O of between 0.67:1 to 1000:1, or between 4:1 to 100:1). Other ranges are also possible. The elemental composition of a layer may be determined by methods such as energy-dispersive X-ray spectroscopy.

In some embodiments, a lithium oxysulfide material described herein may have a formula of $x(yLi_2S+zLi_2O)+MS_2$ (where M is Si, Ge, or Sn), where $y+z=1$, and where x may range from 0.5-3. In certain embodiments, x is at least 0.5, at least 1.0, at least 1.5, at least 2.0, or at least 2.5. In other embodiments, x is less than or equal to 3.0, less than or equal to 2.5, less than or equal to 2.0, less than or equal to 1.5, less than or equal to 1.0, or less than or equal to 0.5. Combinations of the above-noted ranges are also possible. Other values for x are also possible.

The protective layer may comprise, in some embodiments, an amorphous lithium-ion conducting oxysulfide, a crystalline lithium-ion conducting oxysulfide or a mixture of an amorphous lithium-ion conducting oxysulfide and a crystalline lithium-ion conducting oxysulfide, e.g., an amorphous lithium oxysulfide, a crystalline lithium oxysulfide, or a mixture of an amorphous lithium oxysulfide and a crystalline lithium oxysulfide.

In some embodiments, the protective layer material, such as a lithium oxysulfide described above, comprises a glass forming additive ranging from 0 wt % to 30 wt % of the inorganic ion conductor material. Examples of glass forming additives include, for example, $SiO_2$, $Li_2SiO_3$, $Li_4SiO_4$, $Li_3PO_4$, $LiPO_3$, $Li_3PS_4$, $LiPS_3$, $B_2O_3$, $B_2S_3$. Other glass forming additives are also possible. In certain embodiments, glass forming additives may be at least 5 wt %, at least 10 wt %, at least 15 wt %, at least 20 wt %, at least 25 wt %, or at least 30 wt % of the inorganic ion conductor material. In certain embodiments, glass forming additives may be less than or equal to 30 wt %, less than or equal to 25 wt %, less than or equal to 20 wt %, less than or equal to 15 wt %, or less than or equal to 10 wt % of the inorganic ion conductor material. Combinations of the above-noted ranges are also possible. Other values of glass forming additives are also possible.

In some embodiments, one or more additional salts (e.g., lithium salts such as LiI, LiBr, LiCl, $Li_2CO_3$, or $Li_2SO_4$) may be added to the inorganic ion conductor material at a range of, e.g., 0 to 50 mol %. Other salts are also possible. In certain embodiments, additional salts are at least 0 mol %, at least 10 mol %, at least 20 mol %, at least 30 mol %, at least 40 mol %, or at least 50 mol %. In certain embodiments, additional salts are less than or equal to 50 mol %, less than or equal to 40 mol %, less than or equal to 30 mol %, less than or equal to 20 mol %, or less than or equal to 10 mol %. Combinations of the above-noted ranges are also possible. Other values of mol % are also possible.

Additional examples of protective layer materials include lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof.

In certain embodiments, the protective layer is formed of a single-ion conductive material (e.g., a single-ion conductive ceramic material).

Other suitable materials that could be used to form all or part of the protective layer include the ionically conductive materials described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

Those of ordinary skill in the art, given the present disclosure, would be capable of selecting appropriate materials for use as the protective layer. Relevant factors that might be considered when making such selections include the ionic conductivity of the material; the ability to deposit, etch, or otherwise form the material on or with other materials in the electrochemical cell; the brittleness of the material; the compatibility of the material with the polymer or separator material; the compatibility of the material with the electrolyte of the electrochemical cell; the ion conductivity of the material (e.g., lithium ion conductivity); and/or the ability to adhere the material to the separator material.

The protective layer material may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc. In certain embodiments, at least a portion of the protective layer material may be etched or otherwise removed, after which a separator material (e.g., a polymeric separator material) may be formed over the protective layer material.

As described herein, in certain preferred embodiments, a protective layer material can be deposited onto a separator using a vacuum deposition process (e.g., sputtering, CVD, thermal or E-beam evaporation). Vacuum deposition can permit the deposition of smooth, dense, and homogenous thin layers. In other embodiments, the ion conductor (e.g., ceramic) can be coated by drawing and casting the ion conductor from a slurry or gel.

In embodiments in which the protective layer is in the form of a layer (e.g., a layer adjacent and/or attached to a polymer layer (e.g., a separator)), the thickness of the protective layer may vary. The thickness of the protective layer may vary over a range from, for example, 1 nm to 7 microns. For instance, the thickness of the ion conductor layer may be between 1-10 nm, between 10-100 nm, between 10-50 nm, between 30-70 nm, between 100-1000 nm, or between 1-7 microns. The thickness of an ion conductor layer may, for example, be less than or equal to 7 microns, less than or equal to 5 microns, less than or equal to 2 microns, less than or equal to 1000 nm, less than or equal to 600 nm, less than or equal to 500 nm, less than or equal to 250 nm, less than or equal to 100 nm, less than or equal to 70 nm, less than or equal to 50 nm, less than or equal to 25 nm, or less than or equal to 10 nm. In some embodiments, an ion conductor layer is at least 10 nm thick, at least 20 nm thick, at least 30 nm thick, at least 100 nm thick, at least 400 nm thick, at least 1 micron thick, at least 2.5 microns thick, or at least 5 microns thick. Other thicknesses are also possible. Combinations of the above-noted ranges are also possible.

A variety of cathode active materials are suitable for use with cathodes of the electrochemical cells described herein, according to certain embodiments. In some embodiments, the cathode active material comprises a lithium intercalation compound (e.g., a compound that is capable of reversibly inserting lithium ions at lattice sites and/or interstitial sites). In certain cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electroactive material of the second electrode comprises $Li_{1.14}Mn_{0.42}Ni_{0.25}CO_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Jr, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: MgO, $Al_2O_3$, $SiO_2$, $TiO_2$, $ZnO_2$, $SnO_2$, and $ZrO_2$. In some embodiments, such coatings may prevent direct contact between the cathode active material and the electrolyte, thereby suppressing side reactions.

In certain embodiments, the cathode active material comprises sulfur. In some embodiments, the cathode active material comprises electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a cathode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130, each of which is incorporated herein by reference in its entirety for all purposes. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al., each of which is incorporated herein by reference in its entirety for all purposes. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al., each of which is incorporated herein by reference in its entirety for all purposes.

One or more electrodes may further comprise additional additives, such as conductive additives, binders, etc., as described in U.S. Pat. No. 9,034,421 to Mikhaylik et al.; and U.S. Patent Application Publication No. 2013/0316072, each of which is incorporated herein by reference in its entirety for all purposes.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, the electrolyte comprises a fluid that can be added at any point in the fabrication process. In some cases, the electrochemical cell may be fabricated by providing a cathode and an anode, applying an anisotropic force component normal to the active surface of the anode, and subsequently adding the fluid electrolyte such that the electrolyte is in electrochemical communication with the cathode and the anode. In other cases, the fluid electrolyte may be added to the electrochemical cell prior to or simultaneously with the application of the anisotropic force component, after which the electrolyte is in electrochemical communication with the cathode and the anode.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of non-aqueous electrolytes for lithium batteries are described by Dorniney in Lithium Batteries, New Materials, Developments and Perspectives, Chapter 4, pp. 137-165, Elsevier, Amsterdam (1994). Examples of gel polymer electrolytes and solid polymer electrolytes are described by Alamgir et al. in Lithium Batteries, New Materials, Developments and Perspectives, Chapter 3, pp. 93-136, Elsevier, Amsterdam (1994). Heterogeneous electrolyte compositions that can be used in batteries described herein are described in U.S. patent application Ser. No. 12/312,764, filed May 26, 2009 and entitled "Separation of Electrolytes," by Mikhaylik et al., which is incorporated herein by reference in its entirety.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some cases, aqueous solvents can be used as electrolytes, for example, in lithium cells. Aqueous solvents can include water, which can contain other components such as ionic salts. As noted above, in some embodiments, the electrolyte can include species such as lithium hydroxide, or other species rendering the electrolyte basic, so as to reduce the concentration of hydrogen ions in the electrolyte.

Liquid electrolyte solvents can also be useful as plasticizers for gel polymer electrolytes, i.e., electrolytes comprising one or more polymers forming a semi-solid network. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, polysulfones, polyethersulfones, derivatives of the foregoing, copolymers of the foregoing, crosslinked and network structures of the foregoing, and blends of the foregoing, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium bis(fluorosulfonyl)imide (LiFSI). Other electrolyte salts that may be useful include lithium polysulfides (Li$_2$S$_x$), and lithium salts of organic polysulfides (LiS$_x$R)$_n$, where x is an integer from 1 to 20, n is an integer from 1 to 3, and R is an organic group, and those disclosed in U.S. Pat. No. 5,538,812 to Lee et al., which is incorporated herein by reference in its entirety for all purposes.

In some embodiments, the electrolyte comprises one or more room temperature ionic liquids. The room temperature ionic liquid, if present, typically comprises one or more cations and one or more anions. Non-limiting examples of suitable cations include lithium cations and/or one or more quaternary ammonium cations such as imidazolium, pyrrolidinium, pyridinium, tetraalkylammonium, pyrazolium, piperidinium, pyridazinium, pyrimidinium, pyrazinium, oxazolium, and trizolium cations. Non-limiting examples of suitable anions include trifluromethylsulfonate (CF$_3$SO$_3^-$), bis (fluorosulfonyl)imide (N(FSO$_2$)$_2^-$, bis (trifluoromethyl sulfonyl)imide ((CF$_3$SO$_2$)$_2$N$^-$, bis (perfluoroethylsulfonyl) imide((CF$_3$CF$_2$SO$_2$)$_2$N$^-$ and tris(trifluoromethylsulfonyl) methide ((CF$_3$SO$_2$)$_3$C$^-$. Non-limiting examples of suitable ionic liquids include N-methyl-N-propylpyrrolidinium/bis (fluorosulfonyl) imide and 1,2-dimethyl-3-propylimidazolium/bis(trifluoromethanesulfonyl)imide. In some embodiments, the electrolyte comprises both a room temperature ionic liquid and a lithium salt. In some other embodiments, the electrolyte comprises a room temperature ionic liquid and does not include a lithium salt.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode. In some embodiments, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

The first and/or second electrode may comprise, as noted above, pores, according to certain embodiments. As used herein, a "pore" refers to a pore as measured using ASTM Standard Test D4284-07, and generally refers to a conduit, void, or passageway, at least a portion of which is surrounded by the medium in which the pore is formed such that a continuous loop may be drawn around the pore while remaining within the medium. Generally, voids within a material that are completely surrounded by the material (and thus, not accessible from outside the material, e.g. closed cells) are not considered pores within the context of the invention. It should be understood that, in cases where the article comprises an agglomeration of particles, pores include both the interparticle pores (i.e., those pores defined between particles when they are packed together, e.g. interstices) and intraparticle pores (i.e., those pores lying within the envelopes of the individual particles). Pores may comprise any suitable cross-sectional shape such as, for example, circular, elliptical, polygonal (e.g., rectangular, triangular, etc.), irregular, and the like.

The porosity of different portions of an the electrode, such as an edge region or a central region or portions within such regions, may be measured by physically separating the different regions, for example, cutting out the particular region of the electrode, and then measuring the separated portion (e.g., edge region or central region) using the above-referenced ASTM Standard Test D4284-07.

In some embodiments described herein, a force, or forces, is applied to portions of an electrochemical cell. Such application of force may reduce irregularity or roughening of an electrode surface of the cell (e.g., when lithium metal or lithium alloy anodes are employed), thereby improving performance. Electrochemical cells in which anisotropic forces are applied and methods for applying such forces are described, for example, in U.S. Pat. No. 9,105,938, issued Aug. 11, 2015, published as U.S. Patent Publication No. 2010/0035128 on Feb. 11, 2010, and entitled "Application of Force in Electrochemical Cells," which is incorporated herein by reference in its entirety for all purposes.

The force may comprise, in some instances, an anisotropic force with a component normal to an active surface of the anode of the electrochemical cell. In the embodiments described herein, electrochemical cells (e.g., rechargeable batteries) may undergo a charge/discharge cycle involving deposition of metal (e.g., lithium metal or other active material) on a surface of the anode upon charging and reaction of the metal on the anode surface, wherein the metal diffuses from the anode surface, upon discharging. The uniformity with which the metal is deposited on the anode may affect cell performance. For example, when lithium metal is removed from and/or redeposited on an anode, it may, in some cases, result in an uneven surface. For example, upon redeposition it may deposit unevenly forming a rough surface. The roughened surface may increase the amount of lithium metal available for undesired chemical reactions which may result in decreased cycling lifetime and/or poor cell performance. The application of force to the electrochemical cell has been found, in accordance with certain embodiments described herein, to reduce such behavior and to improve the cycling lifetime and/or performance of the cell.

Figure 7:
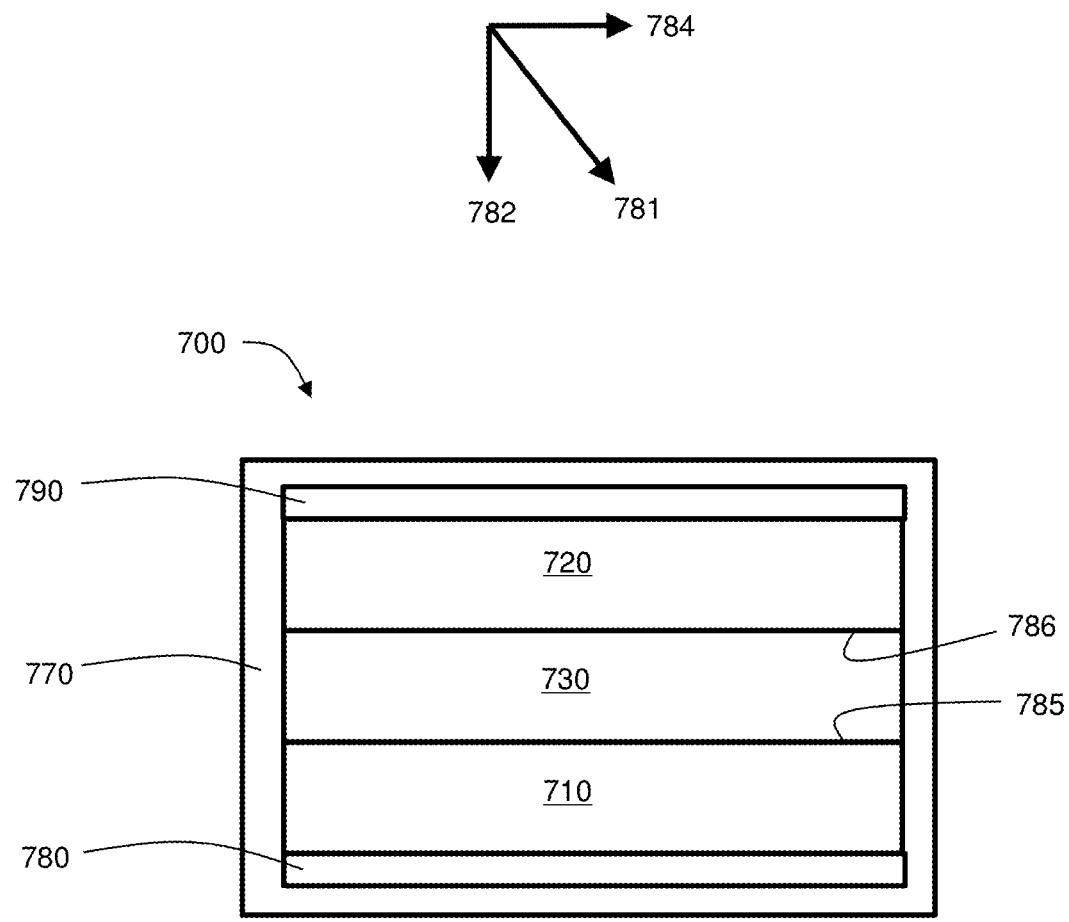
FIG. 7 shows a side view of an electrochemical cell, according to one or more embodiments.

Referring to FIG. 7, a force may be applied in the direction of arrow 781. Arrow 782 illustrates the component of force 781 that is normal to active surface 785 of electrode 710 (as well as active surface 786 of electrode 720). In the case of a curved surface, for example, a concave surface or a convex surface, the force may comprise an anisotropic force with a component normal to a plane that is tangent to the curved surface at the point at which the force is applied.

In some embodiments, an anisotropic force with a component normal to an active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over an active surface of the anode. In some embodiments, the anisotropic force is applied uniformly over one or more active surfaces of the anode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

A force with a "component normal" to a surface, for example an active surface of an anode, is given its ordinary meaning as would be understood by those of ordinary skill in the art and includes, for example, a force which at least in part exerts itself in a direction substantially perpendicular to the surface. Those of ordinary skill can understand other examples of these terms, especially as applied within the description of this document.

In some embodiments, the anisotropic force can be applied such that the magnitude of the force is substantially equal in all directions within a plane defining a cross-section of the electrochemical cell, but the magnitude of the forces in out-of-plane directions is substantially unequal to the magnitudes of the in-plane forces.

In one set of embodiments, cells described herein are constructed and arranged to apply, during at least one period of time during charge and/or discharge of the cell, an anisotropic force with a component normal to the active surface of the anode. Those of ordinary skill in the art will understand the meaning of this. In such an arrangement, the cell may be formed as part of a container which applies such a force by virtue of a "load" applied during or after assembly of the cell, or applied during use of the cell as a result of expansion and/or contraction of one or more portions of the cell itself.

The magnitude of the applied force is, in some embodiments, large enough to enhance the performance of the electrochemical cell. An anode active surface and the anisotropic force may be, in some instances, together selected such that the anisotropic force affects surface morphology of the anode active surface to inhibit increase in anode active surface area through charge and discharge and wherein, in the absence of the anisotropic force but under otherwise essentially identical conditions, the anode active surface area is increased to a greater extent through charge and discharge cycles. "Essentially identical conditions," in this context, means conditions that are similar or identical other than the application and/or magnitude of the force. For example, otherwise identical conditions may mean a cell that is identical, but where it is not constructed (e.g., by brackets or other connections) to apply the anisotropic force on the subject cell.

In some embodiments, an anisotropic force with a component normal to an active surface of the anode is applied, during at least one period of time during charge and/or discharge of the cell, to an extent effective to inhibit an increase in surface area of the anode active surface relative to an increase in surface area absent the anisotropic force. The component of the anisotropic force normal to the anode active surface may, for example, define a pressure of at least about 4.9, at least about 9.8, at least about 24.5, at least about 49, at least about 78, at least about 98, at least about 117.6, at least about 147, at least about 175, at least about 200, at least about 225, or at least about 250 Newtons per square centimeter. In some embodiments, the component of the anisotropic force normal to the anode active surface may, for example, define a pressure of less than about 250, less than about 225, less than about 196, less than about 147, less than about 117.6, less than about 98, less than about 49, less than about 24.5, or less than about 9.8 Newtons per square centimeter. In some cases, the component of the anisotropic force normal to the anode active surface may define a pressure of between about 4.9 and about 147 Newtons per square centimeter, between about 49 and about 117.6 Newtons per square centimeter, between about 68.6 and about 98 Newtons per square centimeter, between about 78 and about 108 Newtons per square centimeter, between about 4.9 and about 250 Newtons per square centimeter, between about 49 and about 250 Newtons per square centimeter, between about 80 and about 250 Newtons per square centimeter, between about 90 and about 250 Newtons per square centimeter, or between about 100 and about 250 Newtons per square centimeter. The force or pressure may, in some embodiments, be externally-applied to the cell, as described herein. While forces and pressures are generally described herein in units of Newtons and Newtons per unit area, respectively, forces and pressures can also be expressed in units of kilograms-force ($kg_f$) and kilograms-force per unit area, respectively. One of ordinary skill in the art will be familiar with kilogram-force-based units, and will understand that 1 kilogram-force is equivalent to about 9.8 Newtons.

As described herein, in some embodiments, the surface of an anode can be enhanced during cycling (e.g., for lithium, the development of mossy or a rough surface of lithium may be reduced or eliminated) by application of an externally-applied (in some embodiments, uniaxial) pressure. The externally-applied pressure may, in some embodiments, be chosen to be greater than the yield stress of a material forming the anode. For example, for an anode comprising lithium, the cell may be under an externally-applied anisotropic force with a component defining a pressure of at least about 8 $kg_f/cm^2$, at least about 9 $kg_f/cm^2$, at least about 10 $kg_f/cm^2$, at least about 20 $kg_f/cm^2$, at least about 30 $kg_f/cm^2$, at least about 40 $kg_f/cm^2$, or at least about 50 $kg_f/cm^2$. This is because the yield stress of lithium is around 7-8 $kg_f/cm^2$. Thus, at pressures (e.g., uniaxial pressures) greater than this value, mossy Li, or any surface roughness at all, may be reduced or suppressed. The lithium surface roughness may mimic the surface that is pressing against it. Accordingly, when cycling under at least about 8 $kg_f/cm^2$, at least about 9 $kg_f/cm^2$, at least about 10 $kg_f/cm^2$, at least about 20 $kg_f/cm^2$, at least about 30 $kg_f/cm^2$, at least about 40 $kg_f/cm^2$, or at least about 50 $kg_f/cm^2$ of externally-applied pressure, the lithium surface may become smoother with cycling when the pressing surface is smooth. As described herein, the pressing surface may be modified by choosing the appropriate material(s) positioned between the anode and the cathode.

In some cases, one or more forces applied to the cell have a component that is not normal to an active surface of an anode. For example, in FIG. 7, force 784 is not normal to active surface 785 of electrode 710. In one set of embodiments, the sum of the components of all applied anisotropic forces in a direction normal to the anode active surface is larger than any sum of components in a direction that is non-normal to the anode active surface. In some embodiments, the sum of the components of all applied anisotropic forces in a direction normal to the anode active surface is at least about 5%, at least about 10%, at least about 20%, at least about 35%, at least about 50%, at least about 75%, at least about 90%, at least about 95%, at least about 99%, or at least about 99.9% larger than any sum of components in a direction that is parallel to the anode active surface.

The anisotropic force described herein may be applied using any suitable method known in the art. In some embodiments, the force may be applied using compression springs. For example, referring to FIG. 7, electrochemical cell 700 may be situated in an optional enclosed containment structure 770 with one or more compression springs situated between current collector 780 and/or current collector 790 and the adjacent wall of containment structure 770 to produce a force with a component in the direction of arrow 782 to electrodes 710 and 720 and separator 730. In some embodiments, the force may be applied by situating one or more compression springs outside the containment structure such that the spring is located between an outside surface of the containment structure and another surface (e.g., a tabletop, the inside surface of another containment structure, an adjacent cell, etc.). Forces may be applied using other elements (either inside or outside a containment structure) including, but not limited to Belleville washers, machine screws, pneumatic devices, and/or weights, among others. For example, in one set of embodiments, one or more cells (e.g., a stack of cells) are arranged between two plates (e.g., metal plates). A device (e.g., a machine screw, a spring, etc.) may be used to apply pressure to the ends of the cell or stack via the plates. In the case of a machine screw, for example, the cells may be compressed between the plates upon rotating the screw. As another example, in some embodiments, one or more wedges may be displaced between a surface of the cell (or the containment structure surrounding the cell) and a fixed surface (e.g., a tabletop, the inside surface of another containment structure, an adjacent cell, etc.). The anisotropic force may be applied by driving the wedge between the cell and the adjacent fixed surface through the application of force on the wedge (e.g., by turning a machine screw).

In some cases, cells may be pre-compressed before they are inserted into containment structures, and, upon being inserted to the containment structure, they may expand to produce a net force on the cell. Such an arrangement may be advantageous, for example, if the cell is capable of withstanding relatively high variations in pressure. In such embodiments, the containment structures may have a relatively high strength (e.g., at least about 100 MPa, at least about 200 MPa, at least about 500 MPa, or at least about 1 GPa). In addition, the containment structure may have a relatively high elastic modulus (e.g., at least about 10 GPa, at least about 25 GPa, at least about 50 GPa, or at least about 100 GPa). The containment structure may comprise, for example, aluminum, titanium, or any other suitable material.

In some embodiments, the use of certain electronically insulating regions and/or methods described herein may result in improved capacity after repeated cycling of the electrochemical cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle. In some embodiments, the electrochemical cell has a capacity of at least 20 mAh, 30 mAh, 40 mAh, 50 mAh, 60 mAh, 70 mAh, or 80 mAh at the end of the cell's third, 10th, 25th, 30th, 40th, 45th, 50th, or 60th cycle.

The following applications are incorporated herein by reference, in their entirety, for all purposes: U.S. Patent Publication No. US 2007/0221265, published on Sep. 27, 2007, filed as application Ser. No. 11/400,781 on Apr. 6, 2006, and entitled "Rechargeable Lithium/Water, Lithium/Air Batteries"; U.S. Patent Publication No. US 2009/0035646, published on Feb. 5, 2009, filed as application Ser. No. 11/888,339 on Jul. 31, 2007, and entitled "Swelling Inhibition in Batteries"; U.S. Patent Publication No. US 2010/0129699, published on May 17, 2010, filed as application Ser. No. 12/312,674 on Feb. 2, 2010, patented as U.S. Pat. No. 8,617,748 on Dec. 31, 2013, and entitled "Separation of Electrolytes"; U.S. Patent Publication No. US 2010/0291442, published on Nov. 18, 2010, filed as application Ser. No. 12/682,011 on Jul. 30, 2010, patented as U.S. Pat. No. 8,871,387 on Oct. 28, 2014, and entitled "Primer for Battery Electrode"; U.S. Patent Publication No. US 2009/0200986, published on Aug. 31, 2009, filed as application Ser. No. 12/069,335 on Feb. 8, 2008, patented as U.S. Pat. No. 8,264,205 on Sep. 11, 2012, and entitled "Circuit for Charge and/or Discharge Protection in an Energy-Storage Device"; U.S. Patent Publication No. US 2007/0224502, published on Sep. 27, 2007, filed as application Ser. No. 11/400,025 on Apr. 6, 2006, patented as U.S. Pat. No. 7,771,870 on Aug. 10, 2010, and entitled "Electrode Protection in Both Aqueous and Non-Aqueous Electrochemical cells, Including Rechargeable Lithium Batteries"; U.S. Patent Publication No. US 2008/0318128, published on Dec. 25, 2008, filed as application Ser. No. 11/821,576 on Jun. 22, 2007, and entitled "Lithium Alloy/Sulfur Batteries"; U.S. Patent Publication No. US 2002/0055040, published on May 9, 2002, filed as application Ser. No. 09/795,915 on Feb. 27, 2001, patented as U.S. Pat. No. 7,939,198 on May 10, 2011, and entitled "Novel Composite Cathodes, Electrochemical Cells Comprising Novel Composite Cathodes, and Processes for Fabricating Same"; U.S. Patent Publication No. US 2006/0238203, published on Oct. 26, 2006, filed as application Ser. No. 11/111,262 on Apr. 20, 2005, patented as U.S. Pat. No. 7,688,075 on Mar. 30, 2010, and entitled "Lithium Sulfur Rechargeable Battery Fuel Gauge Systems and Methods"; U.S. Patent Publication No. US 2008/0187663, published on Aug. 7, 2008, filed as application Ser. No. 11/728,197 on Mar. 23, 2007, patented as U.S. Pat. No. 8,084,102 on Dec. 27, 2011, and entitled "Methods for Co-Flash Evaporation of Polymerizable Monomers and Non-Polymerizable Carrier Solvent/Salt Mixtures/Solutions"; U.S. Patent Publication No. US 2011/0006738, published on Jan. 13, 2011, filed as application Ser. No. 12/679,371 on Sep. 23, 2010, and entitled "Electrolyte Additives for Lithium Batteries and Related Methods"; U.S. Patent Publication No. US 2011/0008531, published on Jan. 13, 2011, filed as application Ser. No. 12/811,576 on Sep. 23, 2010, patented as U.S. Pat. No. 9,034,421 on May 19, 2015, and entitled "Methods of Forming Electrodes Comprising Sulfur and Porous Material Comprising Carbon"; U.S. Patent Publication No. US 2010/0035128, published on Feb. 11, 2010, filed as application Ser. No. 12/535,328 on Aug. 4, 2009, patented as U.S. Pat. No. 9,105,938 on Aug. 11, 2015, and entitled "Application of Force in Electrochemical Cells"; U.S. Patent Publication No. US 2011/0165471, published on Jul. 15, 2011, filed as application Ser. No. 12/180,379 on Jul. 25, 2008, and entitled "Protection of Anodes for Electrochemical Cells"; U.S. Patent Publication No. US 2006/0222954, published on Oct. 5, 2006, filed as application Ser. No. 11/452,445 on Jun. 13, 2006, patented as U.S. Pat. No. 8,415,054 on Apr. 9, 2013, and entitled "Lithium Anodes for Electrochemical Cells"; U.S. Patent Publication No. US 2010/0239914, published on Sep. 23, 2010, filed as application Ser. No. 12/727,862 on Mar. 19, 2010, and entitled "Cathode for Lithium Battery"; U.S. Patent Publication No. US 2010/0294049, published on Nov. 25, 2010, filed as application Ser. No. 12/471,095 on May 22, 2009, patented as U.S. Pat. No. 8,087,309 on Jan. 3, 2012, and entitled "Hermetic Sample Holder and Method for Performing Microanalysis under Controlled Atmosphere Environment"; U.S. Patent Publication No. US 2011/00765560, published on Mar. 31, 2011, filed as application Ser. No. 12/862,581 on Aug. 24, 2010, and entitled "Electrochemical Cells Comprising Porous Structures Comprising Sulfur"; U.S. Patent Publication No. US 2011/0068001, published on Mar. 24, 2011, filed as application Ser. No. 12/862,513 on Aug. 24, 2010, and entitled "Release System for Electrochemical Cells"; U.S. Patent Publication No. US 2012/0048729, published on Mar. 1, 2012, filed as application Ser. No. 13/216,559 on Aug. 24, 2011, and entitled "Electrically Non-Conductive Materials for Electrochemical Cells"; U.S. Patent Publication No. US 2011/0177398, published on Jul. 21, 2011, filed as application Ser. No. 12/862,528 on Aug. 24, 2010, and entitled "Electrochemical Cell"; U.S. Patent Publication No. US 2011/0070494, published on Mar. 24, 2011, filed as application Ser. No. 12/862,563 on Aug. 24, 2010, and entitled "Electrochemical Cells Comprising Porous Structures Comprising Sulfur"; U.S. Patent Publication No. US 2011/0070491, published on Mar. 24, 2011, filed as application Ser. No. 12/862,551 on Aug. 24, 2010, and entitled "Electrochemical Cells Comprising Porous Structures Comprising Sulfur"; U.S. Patent Publication No. US 2011/0059361, published on Mar. 10, 2011, filed as application Ser. No. 12/862,576 on Aug. 24, 2010, patented as U.S. Pat. No. 9,005,009 on Apr. 14, 2015, and entitled "Electrochemical Cells Comprising Porous Structures Comprising Sulfur"; U.S. Patent Publication No. US 2012/0070746, published on Mar. 22, 2012, filed as application Ser. No. 13/240,113 on Sep. 22, 2011, and entitled "Low Electrolyte Electrochemical Cells"; U.S. Patent Publication No. US 2011/0206992, published on Aug. 25, 2011, filed as application Ser. No. 13/033,419 on Feb. 23, 2011, and entitled "Porous Structures for Energy Storage Devices"; U.S. Patent Publication No. 2013/0017441, published on Jan. 17, 2013, filed as application Ser. No. 13/524,662 on Jun. 15, 2012, patented as U.S. Pat. No. 9,548,492 on Jan. 17, 2017, and entitled "Plating Technique for Electrode"; U.S. Patent Publication No. US 2013/0224601, published on Aug. 29, 2013, filed as application Ser. No. 13/766,862 on Feb. 14, 2013, patented as U.S. Pat. No. 9,077,041 on Jul. 7, 2015, and entitled "Electrode Structure for Electrochemical Cell"; U.S. Patent Publication No. US 2013/0252103, published on Sep. 26, 2013, filed as application Ser. No. 13/789,783 on Mar. 8, 2013, patented as U.S. Pat. No. 9,214,678 on Dec. 15, 2015, and entitled "Porous Support Structures, Electrodes Containing Same, and Associated Methods"; U.S. Patent Publication No. US 2013/0095380, published on Apr. 18, 2013, filed as application Ser. No. 13/644,933 on Oct. 4, 2012, patented as U.S. Pat. No. 8,936,870 on Jan. 20, 2015, and entitled "Electrode Structure and Method for Making the Same"; U.S. Patent Publication No. US 2014/0123477, published on May 8, 2014, filed as application Ser. No. 14/069,698 on Nov. 1, 2013, patented as U.S. Pat. No. 9,005,311 on Apr. 14, 2015, and entitled "Electrode Active Surface Pretreatment"; U.S. Patent Publication No. US 2014/0193723, published on Jul. 10, 2014, filed as application Ser. No. 14/150,156 on Jan. 8, 2014, patented as U.S. Pat. No. 9,559,348 on Jan. 31, 2017, and entitled "Conductivity Control in Electrochemical Cells"; U.S. Patent Publication No. US 2014/0255780, published on Sep. 11, 2014, filed as application Ser. No. 14/197,782 on Mar. 5, 2014, patented as U.S. Pat. No. 9,490,478 on Nov. 6, 2016, and entitled "Electrochemical Cells Comprising Fibril Materials"; U.S. Patent Publication No. US 2014/0272594, published on Sep. 18, 2014, filed as application Ser. No. 13/833,377 on Mar. 15, 2013, and entitled "Protective Structures for Electrodes"; U.S. Patent Publication No. US 2014/0272597, published on Sep. 18, 2014, filed as application Ser. No. 14/209,274 on Mar. 13, 2014, and entitled "Protected Electrode Structures and Methods"; U.S. Patent Publication No. US 2014/0193713, published on Jul. 10, 2014, filed as application Ser. No. 14/150,196 on Jan. 8, 2014, patented as U.S. Pat. No. 9,531,009 on Dec. 27, 2016, and entitled "Passivation of Electrodes in Electrochemical Cells"; U.S. Patent Publication No. US 2014/0272565, published on Sep. 18, 2014, filed as application Ser. No. 14/209,396 on Mar. 13, 2014, and entitled "Protected Electrode Structures"; U.S. Patent Publication No. US 2015/0010804, published on Jan. 8, 2015, filed as application Ser. No. 14/323,269 on Jul. 3, 2014, and entitled "Ceramic/Polymer Matrix for Electrode Protection in Electrochemical Cells, Including Rechargeable Lithium Batteries"; U.S. Patent Publication No. US 2015/044517, published on Feb. 12, 2015, filed as application Ser. No. 14/455,230 on Aug. 8, 2014, and entitled "Self-Healing Electrode Protection in Electrochemical Cells"; U.S. Patent Publication No. US 2015/0236322, published on Aug. 20, 2015, filed as application Ser. No. 14/184,037 on Feb. 19, 2014, and entitled "Electrode Protection Using Electrolyte-Inhibiting Ion Conductor"; and U.S. Patent Publication No. US 2016/0072132, published on Mar. 10, 2016, filed as application Ser. No. 14/848,659 on Sep. 9, 2015, and entitled "Protective Layers in Lithium-Ion Electrochemical Cells and Associated Electrodes and Methods".

U.S. Provisional Application No. 62/472,716, filed Mar. 17, 2017, and entitled "Electrode Edge Protection in Electrochemical Cells," is also incorporated herein by reference in its entirety for all purposes.

The following examples are intended to illustrate certain embodiments of the present invention, but do not exemplify the full scope of the invention.

EXAMPLES

In the following examples and comparative examples, the cells were prepared by the following methods: an anode was formed by vacuum depositing a layer of lithium (having a thickness of approximately 25 µm) onto a polyethylene terephthalate (PET) substrate with a 200 nm thick copper layer as current collector. The lithium was released from the PET substrate during assembly. The porous separator used was 25 µm polyolefin (Celgard 2325). Two different types of cathodes were used. In some cases, the cathode used was a sulfur-based cathode. The sulfur cathode comprised an active cathode material having a loading of 1.89 mg/cm$^2$/side. The sulfur cathode comprised a blend of 56 wt. % elemental sulfur powder (available from Alfa Aesar) with 20% MCMB graphite (available from Osaka Gas Chemical), 20% Vulcan carbon black (available from Cabot Corporation) and 3% PVOH binder (available from Sekisui Specialty Chemicals) in a water/isopropyl alcohol mixture. The resultant slurry was coated on aluminum foil that had a layer of primer composed of PVOH and carbon black.

Alternatively, in some tests the cathode used was a LiFePO$_4$ (LFP) cathode available from Enertech. The LFP cathode comprised an active cathode material having a loading of 8.9 mg/cm$^2$/side. The LFP cathode further comprised conductive carbon, and PVdF binder coated on aluminum foil.

The above components were assembled in a layered structure to form a cell. In some cases, the layered structure was of a single cell type: having an anode/separator/cathode arrangement in which a single anode is paired with a single cathode (providing for a total active surface area of 16.6 cm$^2$). In other cases, the layered structure was of a cathode-centered (CC) cell type: having an anode/separator/cathode/separator/anode arrangement in which a double-sided cathode is positioned between an anode on either side (providing for a total active cathode surface area was 33.147 cm$^2$). After sealing the cell components in a foil pouch, either 0.3 mL for single cell or 0.35 mL for CC cell of the appropriate electrolytes was added. The cell package was then vacuum sealed. These cells were allowed to soak in the electrolyte for 24 hours unrestrained and then 10 kg/cm$^2$ pressure was applied. All the cells were cycled under such pressure. The cycling conditions are specified in each example or comparative example, below. The utilization of the anode active edge was examined after 10th or 25th discharge by optical and scanning electron microscopy.

The following examples and comparative examples describe the anode edge utilization evaluated in these cells.

Comparative Example 1

In this comparative example, cathode-centered-type Li—S cells in DD-16-4 electrolyte (1:1 weight ratio of DOL/DME, 16% LiTFSi, 4% LiNO$_3$) were tested. The charge discharge cycles were as follows: C/50 (1.3 mA) discharge to 1.7 V followed by a C/8 (7.8 mA) charge to 2.5 V under constant current, at which point the voltage was held constant while the current decayed to 0.5 mA, for the first three cycles; C/5 (13.7 mA) discharge to 1.5 V followed by a C/8 (7.8 mA) charge to 2.5 V under constant current, at which point the voltage was held constant while the current decayed to 0.5 mA, for subsequent cycles.

Comparative Example 2

In this comparative example, single-type Li-LFP cells in DD-16-4 electrolyte (1:1 weight ratio of DOL/DME, 16% LiTFSi, 4% LiNO$_3$) were tested. Cells were tested under the following charge/discharge conditions: a 2.5 mA charge was applied until a voltage of 3.7 V was reached, at which point the voltage was held constant while the current decayed to 0.5 mA, followed by a 4 mA discharge to 2.8 V.

Comparative Example 3

In this comparative example, single Li—S cells in DD-8-4 electrolyte (1:1 weight ratio of DOL/DME, 8% LiTFSi, 4% LiNO$_3$) were tested. Cells were tested under the following conditions: 1 mA discharge to 1.7 V followed by a 2.5 mA charge to 2.5 V, at which point the voltage was held constant while the current was discharged to 0.5 mA, for the first cycle, and 4 mA discharge to 1.5 V followed by a 2.5 mA charge to 2.5 V, at which point the voltage was held constant while the current was discharged to 0.5 mA, for the following cycles.

Example 1

Figure 8A:
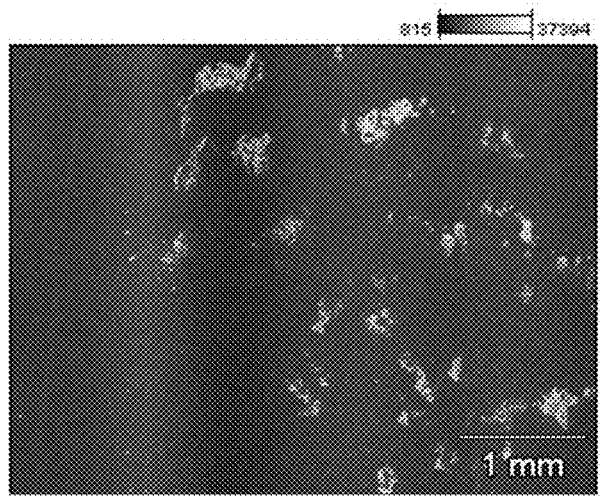
FIG. 8A shows an image of an example of an electrode, according to one or more embodiments.
Figure 8B:
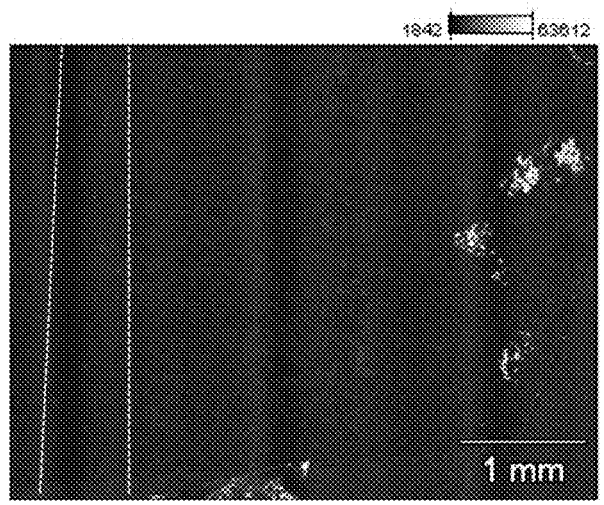
FIG. 8B shows an image of an example of an electrode, according to one or more embodiments.
Figure 9:
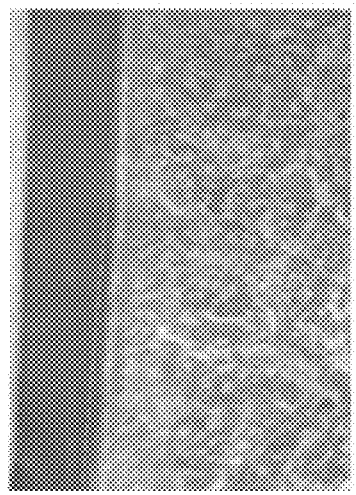
FIG. 9 shows an image of an example of an electrode, according to one or more embodiments.
Figure 10:
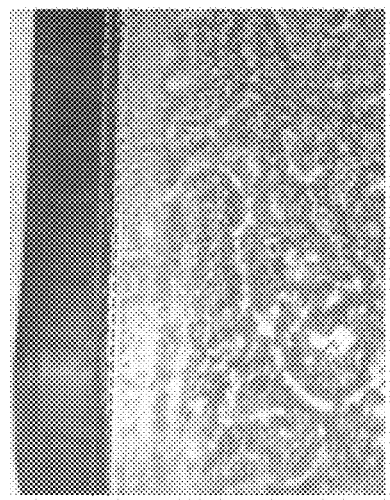
FIG. 10 shows an image of an example of an electrode, according to one or more embodiments.
Figure 10:
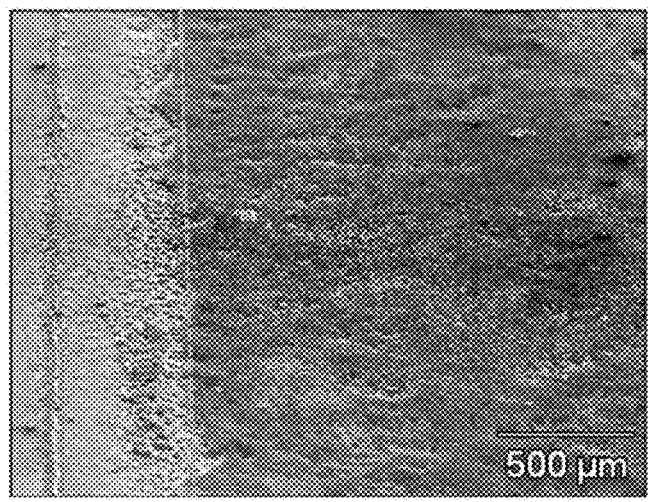

In this example, all of the cell components and testing conditions were the same as in comparative example 1, except the cathode edge opposite to the cathode current collector was partially scraped off to produce a tapered edge region. The outer 1 to 2 mm of the cathode edge region was tapered using a small glass fiber brush, in which an amount of active material was physically brushed off. The tapering was accomplished by holding the brush at a 45-60° angle to the surface of the cathode. The cathodes were 45 mm long and 37 mm wide, while the tapering extended for 1-2 mm. FIG. 8A shows the SEM back-scattered electron image of an anode surface from a cell from Comparative Example 1, after a $10^{th}$ discharge. FIG. 8B shows the SEM back-scattered electron image of an anode surface from a cell having a tapered cathode edge region as described in Example 1, after a 10th discharge. The white areas are the exposed copper current collector due to depletion of lithium resulting from over utilization of the anode. Due to the formation of a tapered edge region in the cathode, a more even utilization in the anode was realized in Example 1 (FIG. 8B) as compared to Comparative Example 1 (FIG. 8A). FIGS. 9 and 10 show the optical and SEM images of the anode areas opposite to the regular cathode edge (comparative example 1), and to the scrapped off cathode edge (example 1), respectively, after a 10th discharge. A gradient of lithium utilization can be observed on the anode between the lines in the cells with scrapped cathode edges (FIG. 10) as opposed to a sharp step generated in cells without cathode edge tapering (FIG. 9).

Example 2

Figure 11:
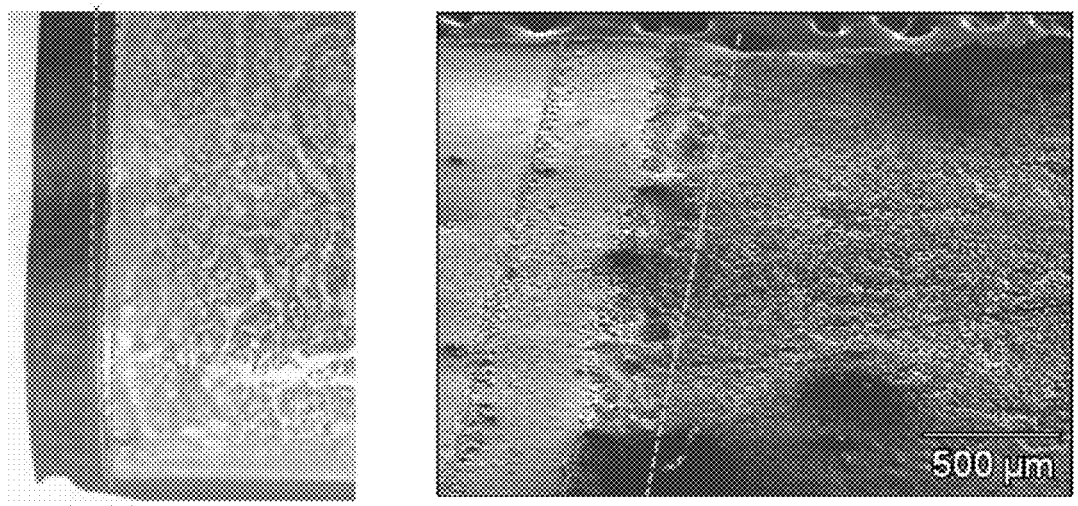
FIG. 11 shows an image of an example of an electrode, according to one or more embodiments.

In this example, all of the cell components and testing conditions were the same as in comparative example 1, except the outer 1 to 2 mm of the cathode edge region opposite to the cathode current collector was dip coated with 2% Oppanol B30 solution to obtain a gradually reduced porosity to the edge of the cathode. FIG. 11 shows the optical and SEM images of the anode areas opposite to the coated cathode edge after a 10th discharge. A gradient of Li utilization was observed on the anode between the dashed lines in the cells with coated cathode edge as opposed to a sharp step generated in the comparative example 1 with regular cathode edge (FIG. 9). The edge region shows a reduced utilization as compared to that in Comparative Example 1.

Example 3

Figure 12A:
FIG. 12A shows an image of an example of an electrode, according to one or more embodiments.
Figure 12B:
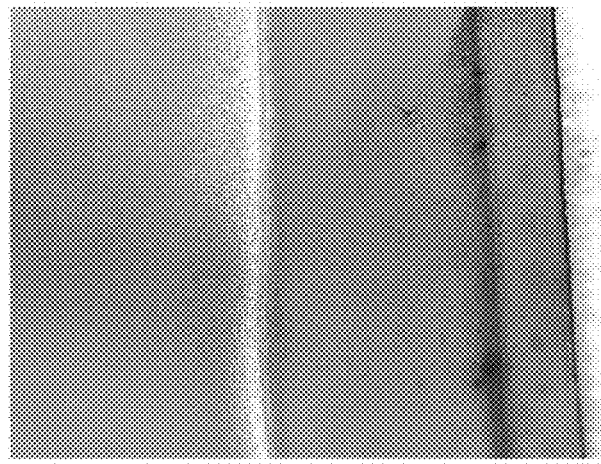
FIG. 12B shows an image of an example of an electrode, according to one or more embodiments.

In this example, all of the cell components and testing conditions were same as comparative example 2, except the outer 1 to 2 mm of the cathode edge region opposite to the cathode current collector was dip coated with 2% Oppanol B30 solution to obtain a gradually reduced porosity to the edge of the cathode. FIG. 12A shows the optical image of anode areas corresponding to the regular cathode edge of Comparative Example 2 after the 25th cycle. FIG. 12B shows the optical image of anode areas corresponding to the dipped coated cathode edge after the 25th cycle. A more even utilization as compared to cells from Comparative Example 3 was also observed with this approach.

Example 4

In this example, all the cell components and testing conditions were the same as in Comparative Example 3, except the cathode edges were partially scraped off to produce a tapered edge. Solvent loss (a measure based on the weight difference of the initial and remaining solvent in the cell) from these cells after the 10th charge was determined. The average solvent loss, which serves as a measure of the undesired reaction between the metallic lithium and the electrolyte from cells in comparative example 3 was 6.4%. It was reduced to 5.5% in cells with a scraped or tapered cathode edge, corresponding to an approximately 14% reduction in solvent loss. This result indicates such an approach mitigates the degree of side reaction between lithium and electrolyte. A reduced solvent loss, which corresponds to less solvent being consumed, indicated that the protective layer was more intact in the cells with the modified edge region While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode, comprising:
    an electrode active material;
    an edge;
    an edge region proximate the edge; and
    a central region,
    wherein:
        the edge region comprises the outer 1% of the electrode and the central region comprises the central 50% of the electrode,
        the edge region of the electrode has at least one surface-area-normalized accessible capacity that is less than 50% of at least one surface-area-normalized accessible capacity within the central region of the electrode; and
        wherein the edge region is infiltrated with a gradient copolymer coating that reduces the surface-area-normalized electrolyte uptake.

2. The electrode of claim 1, wherein the edge-region-normalized accessible capacity of the edge region has a value of less than 80% of the central-area-normalized accessible capacity of the central region of the electrode.

3. The electrode of claim 1, wherein the edge region comprises a tapered region.

4. The electrode of claim 1, wherein the edge region comprises a compressed region.

5. The electrode of claim 1, wherein the edge region comprises a coating material configured to reduce pore volume.

6. The electrode of claim 1, wherein the edge region comprises a coating material configured to reduce conductivity in the edge region.

7. The electrode of claim 1, wherein the edge region is the outer 1% of the electrode.

8. The electrode of claim 1, wherein the central region of the electrode is the inner 50% of the electrode.

9. The electrode of claim 1, wherein the electrode comprises a lithium intercalation compound.

10. The electrode of claim 1, wherein the surface-area normalized electrolyte uptake of the electrode decreases monotonically in at least one direction from the inner border of the edge region, through the edge region, toward and to the edge of the electrode.

11. The electrode of claim 1, wherein the surface-area normalized electrolyte uptake decreases substantially continuously in at least one direction from the inner border of the edge region, through the edge region, toward and to the edge of the electrode.

12. The electrode of claim 1, wherein the surface-area normalized accessible capacity of the electrode decreases monotonically in at least one direction from the inner border of the edge region, through the edge region, toward and to the edge of the electrode.

13. The electrode of claim 1, wherein the surface-area normalized amount of the electrode active material of the electrode decreases monotonically in at least one direction from the inner border of the edge region, through the edge region, toward and to the edge of the electrode.

14. The electrode of claim 1, wherein the surface-area normalized pore volume of the electrode decreases monotonically in at least one direction from the inner border of the edge region, through the edge region, toward and to the edge of the electrode.

15. The electrode of claim 1, wherein the surface-area normalized conductivity of the electrode decreases monotonically in at least one direction from the inner border of the edge region, through the edge region, toward and to the edge of the electrode.

16. The electrode of claim 1, wherein the thickness of the electrode decreases monotonically in at least one direction from the inner border of the edge region, through the edge region, toward and to the edge of the electrode.

17. An electrode, comprising:
    an electrode active material;
    an edge; and
    an edge region proximate the edge;
    wherein:
        a surface-area-normalized accessible capacity of the electrode decreases in at least one direction from the inner border of the edge region of the electrode, through the edge region, toward and to the edge of the electrode; and
        wherein the edge region is infiltrated with a gradient copolymer coating that reduces the surface-area-normalized electrolyte uptake.

18. An electrode, comprising:
    an electrode active material;
    an edge;
    an edge region proximate the edge; and
    a central region,
    wherein:

the edge region comprises the outer 1% of the electrode and the central region comprises the central 50% of the electrode, the edge region has at least one surface-area-normalized amount of the electrode active material that is less than 50% of at least one surface-area-normalized amount of the electrode active material within the central region; and the edge region is infiltrated with a gradient copolymer coating that reduces the surface-area-normalized electrolyte uptake.

* * * * *